US010963370B2

(12) United States Patent
Battaglia et al.

(10) Patent No.: US 10,963,370 B2
(45) Date of Patent: *Mar. 30, 2021

(54) DEFAULT MOCK IMPLEMENTATIONS AT A SERVER

(71) Applicant: salesforce.com, inc., San Francisco, CA (US)

(72) Inventors: Martin Battaglia, Pilar (AR); Ignacio Agustin Manzano, Buenos Aires (AR)

(73) Assignee: salesforce.com, inc., San Francisco, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 16/252,226

(22) Filed: Jan. 18, 2019

(65) Prior Publication Data
US 2020/0233786 A1 Jul. 23, 2020

(51) Int. Cl.
G06F 11/00 (2006.01)
G06F 11/36 (2006.01)
G06F 9/54 (2006.01)
H04L 29/08 (2006.01)

(52) U.S. Cl.
CPC .......... G06F 11/3688 (2013.01); G06F 9/547 (2013.01); H04L 67/10 (2013.01); H04L 67/146 (2013.01)

(58) Field of Classification Search
CPC ... G06F 11/36; G06F 11/3664; G06F 11/3612
See application file for complete search history.

(56) References Cited

U.S. PATENT DOCUMENTS

| 10,089,219 B1* | 10/2018 | Bates ..................... G06F 9/451 |
| 2017/0068526 A1* | 3/2017 | Seigel ................ G06F 11/3409 |
| 2017/0300402 A1* | 10/2017 | Hoffner .............. G06F 11/3664 |
| 2018/0060220 A1* | 3/2018 | Yao ..................... G06F 11/3684 |
| 2018/0276111 A1* | 9/2018 | Datta ................. G06F 11/3696 |
| 2019/0155721 A1* | 5/2019 | Reeve ................ G06F 11/3688 |
| 2020/0233786 A1* | 7/2020 | Battaglia ............ G06F 11/3688 |
| 2020/0233787 A1* | 7/2020 | Battaglia ............... H04L 67/10 |
| 2020/0233790 A1* | 7/2020 | Battaglia ............ G06F 11/3664 |

* cited by examiner

*Primary Examiner* — Jonathan D Gibson
(74) *Attorney, Agent, or Firm* — Holland & Hart LLP

(57) ABSTRACT

A system may include a mocking server and one or more tenants served by the mocking server. A tenant may test an application programming interface (API) using a mocking service. For example, the mocking server may run a mock implementation of an API based on an API specification, and the server may expose an endpoint of the mock implementation for API testing. In some cases, the API specification may use an additional service. The mocking server may need an implementation for this additional service in order to test the API. For improved efficiency and reliability of the mocking service, the mocking server may store pre-configured mock implementations for various service or complementary APIs, which can be publicly accessed and shared across multiple different tenants. The pre-configured mock implementations may enable a user to test an API without providing a mock implementation for each additional service indicated in the API specification.

20 Claims, 13 Drawing Sheets

DEFAULT MOCK IMPLEMENTATIONS AT A SERVER

FIELD OF TECHNOLOGY

The present disclosure relates generally to database systems and data processing, and more specifically to default mock implementations at a server.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A server may host a mocking service for testing and validating an application programming interface (API). The mocking service may generate a mock implementation for the API based on an API specification, which details features, processes, and functions of the API. By using an exposed endpoint of the mock implementation, a user can test functionality of the API per the API specification. Some API specifications may indicate an additional service (e.g., a security configuration) which is required to run the mock implementation. API specifications which indicate an additional service may require the user to provide two API specifications, which may lead to increased complexity for running a mock implementation.

DETAILED DESCRIPTION

Figure 1:
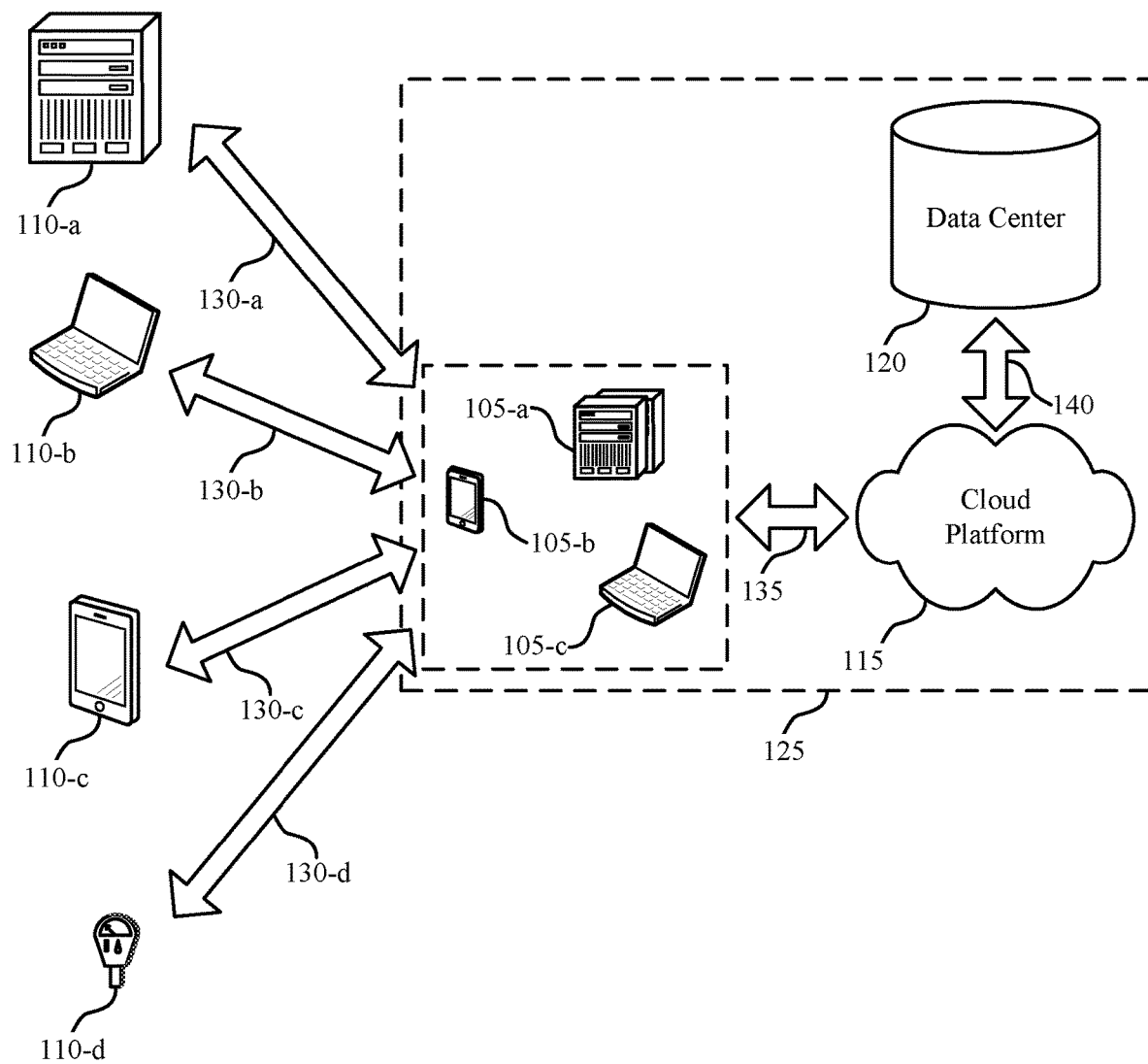
FIG. 1 illustrates an example of a system for testing an API at a server that supports default mock implementations at a server in accordance with aspects of the present disclosure.

A system, such as a cloud-based system supporting customer relationship management (CRM) solutions, may support a mocking server which hosts an application programming interface (API) mocking service. The mocking service may provide secure, efficient API testing and validating. The mocking service may expose an endpoint of a mock API instance to a user, which the user may use for testing the API prior to full implementation (e.g., publishing) of the API. The testing may be based on an API specification and its underlying metadata. An API specification may refer to a document or program that defines at least a portion of the functionality of an API (e.g., including any combination of behaviors, definitions, documentation, etc. for the API). The user may validate whether the API is functioning properly and troubleshoot any problems with the API by interacting with the endpoint of the mock implementation for the API and viewing the mocking results of the mocking service. In some cases, the mocking server hosting the mocking service may generate the mock implementation of the API based on a parsed model of an API specification for the API. The user may design the API specification, parse the API specification into something interpretable by the mocking server, and provide the parsed mock model of the API specification to the mocking server. The mocking server may then generate a mock implementation of the API based on the mock model and metadata of the API specification.

In some cases, an API specification, or metadata of the API specification, may specify a complementary or additional service for the API. For example, an API may utilize an authentication service or security scheme, where the user is requested to complete a security workflow when implementing the API (e.g., including when implementing a mock version of the API). As such, the mocking server may need to perform a mock implementation of the complementary or additional service when testing the API through the mocking service's console. If the API specification utilizes an additional service, the user may be required to provide an implementation of the service in order to test the API, even when the API is mocked using the mocking service. If the user does not have access to a mock model of the service, the user may not be able to test the API.

To improve the efficiency and reliability of the mocking service, a mocking server in a system described herein may support one or more default mock models. The default mock models may be pre-configured and stored in memory at the mocking server. The server or testing console, or both, may detect an API's use of an additional service (e.g., an authentication API or security API), determine that a default mock implementation for the additional service is provided by the mocking service, and implement the default mock implementation for the service (e.g., autonomously) such that the user does not have to specify, implement, or provide a mock model for the service. The testing console may work together with the predefined mocks when the mocking service is on, and the user may not have to provide any additional information or perform any additional actions to run a mock implementation of the service API. Therefore, when a user requests to run a mock implementation for an API with an API specification that uses a complementary service, the console of the mocking server may detect the complementary service based on metadata of the API specification. The console may request to run a mock implementation using a default mock model for the complementary service which is stored in memory at the mocking server. The mocking server may provide a credential or certificate for the user based on running the default mock implementation for the complementary service. The user may then request to run a mock implementation for the API (e.g., uninterrupted) after the server runs the mock implementation for the complementary service.

The default mock models may be publicly accessible, for example by accessing a uniform resource locator (URL) via a web browser. Thus, multiple different tenants of the mocking server may request to run an instance of the same default mock implementation. In some cases, the default mock implementations may be configured to run based on a toggle or configuration of a console. The mocking server may be configured to receive and store additional default mock models, update existing default mock models (e.g., based on service updates), or both. For example, if another version of a security configuration is released, the mocking server may store a default mock model for the new version of the security configuration in memory at the mocking server.

Aspects of the disclosure are initially described in the context of an environment supporting an on-demand database service. Aspects of the disclosure are further illustrated by and described with reference to apparatus diagrams, system diagrams, and flowcharts that relate to default mock implementations at a server.

FIG. 1 illustrates an example of a system 100 for testing an API at a server that supports default mock implementations at a server in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may include a server, such as a mocking server, which hosts an API mocking service. In some cases, the server may include aspects of an application server as described herein. The mocking service may support secure, efficient API testing and validating. The mocking service may expose an endpoint of the API to a user, which may be an example of a cloud client 105 or a contact 110. The user may further be an example of or associated with a tenant of the mocking server, where the tenant or user subscribes to the mocking service. The user may use the endpoint to test the API prior to full implementation (e.g., publishing) of the API. The testing may be based on an API specification and its underlying metadata. An API specification may refer to a document or program that defines at least a portion of the functionality of an API (e.g., including any combination of behaviors, definitions, documentation, etc. for the API). The user may validate whether the API is functioning properly and troubleshoot any problems with the API based on results of the mocking service. A mocking service console may be visually displayed via a user interface at a user device, where the mocking service console handles transmitting and receiving messages between the mocking server and the user device.

In conventional systems, a server hosting a mocking service may generate a mock implementation of an API based on a parsed model of an API specification. To test an API, a user may provide the server with the parsed model of the API specification for the API. In some cases, the API specification or its metadata may specify a complementary or additional service for the API. For example, the API may utilize an authentication service or security scheme, and the user may be requested to complete a security workflow when testing the API through the mocking service's console. The additional service may have an API which may similarly be mocked and implemented by the mocking service. The user may be required to provide an implementation of the service in order to test the API, even when the API is mocked using the mocking service. If the user does not have access to a mock model of the service, the user may not be able to test the API. Additionally, many different users may need to supply the same mock model to simulate running multiple different APIs. This may result in an inefficient usage of resources at the server to handle the heavy traffic of frequently implemented mock models (e.g., mock models for certain services).

In contrast, a mocking server in the system 100 may provide some default mock models and default mock model handling mechanisms for improved resource efficiency. The default mock models may be pre-configured and stored in memory at the server. The server, a testing console running on a user device, or both may detect the use of an additional service corresponding to one of the default mock models such that the user does not have to specify or implement a mock model for the service. The testing console may work together with the predefined mocks when the mocking service is on, and the user may not have to provide any additional information or perform any additional actions to run a mock implementation of the API. When a user requests to run a mock implementation for an API with an API specification that uses a complementary service, the console of the mocking server may detect the complementary service based on metadata of the API specification. The console may handle sending a request to run a mock implementation of a default mock model for the complementary service which is stored in memory at the mocking server. In one example, if the complementary service is an authorization service, the mocking server may provide a credential or certificate for the user based on running the default mock implementation for this mock authorization service. In some cases, the user may then request to run a mock implementation for the API (e.g., uninterrupted) after the server runs the mock implementation for the complementary service. In other cases, both mock implementations (i.e., a mock implementation for a complementary service to an API and a mock implementation for the API) may be triggered in sequence based on a single request to run a mock implementation of the API. The mock implementation for the API may run successfully based on the service console requesting to run a pre-configured mock model of the complementary service. The user does not have to provide any additional information or models for the service to run a mock implementation of their API (e.g., other than the model for the API itself).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example, a developer may design an API specification for an API which utilizes an additional service. For example, the API may use an authentication service such as Open Authorization (OAuth) 1 (OAuth1), OAuth2, Open Banking, etc. The API specification, or metadata of the API specification, may indicate that the API utilizes this additional service. The developer may provide the API specification, an identifier for the API specification, or a parsed model of the API specification to the mocking server. The developer may navigate a user interface at a user device to provide information for the API (e.g., the API specification, the identifier, or the parsed model) to the mocking server and to use the mocking service. A console for the mocking service, which may be visually displayed through the user interface, may identify the API specification for the API. The console may identify the additional service associated with the API specification (e.g., based on metadata of the API specification) and determine to run a default mock implementation of the service at the mocking server. For example, the console may detect that the API utilizes the authentication service, and the console may determine that the mocking server stores an out-of-the-box or pre-configured mock implementation of the specified service in memory.

The console may transmit a first request message indicating a default, or pre-configured, mock implementation for the additional service specified in the developer's API. The mocking server may run the mock implementation for the additional service using the pre-configured mock implementation. In some cases, the mocking server may provide an authentication credential for the user based on running the pre-configured mock implementation (e.g., if the additional service is an example of an authentication service). The authentication credential may enable the mocking server to run a mock implementation for the API, as the mocking server may be unable to run the mock implementation for the API without the credential based on the API specification indicating the additional service (e.g., where the additional service uses the credential to authorize use of the API). The console may then transmit a second request to run a mock implementation for the API at the mocking server. The mocking server may run, in the memory of the server, the mock implementation for the API based on receiving the second request and, in some cases, a successful result of the mock implementation for the additional service.

Figure 2:
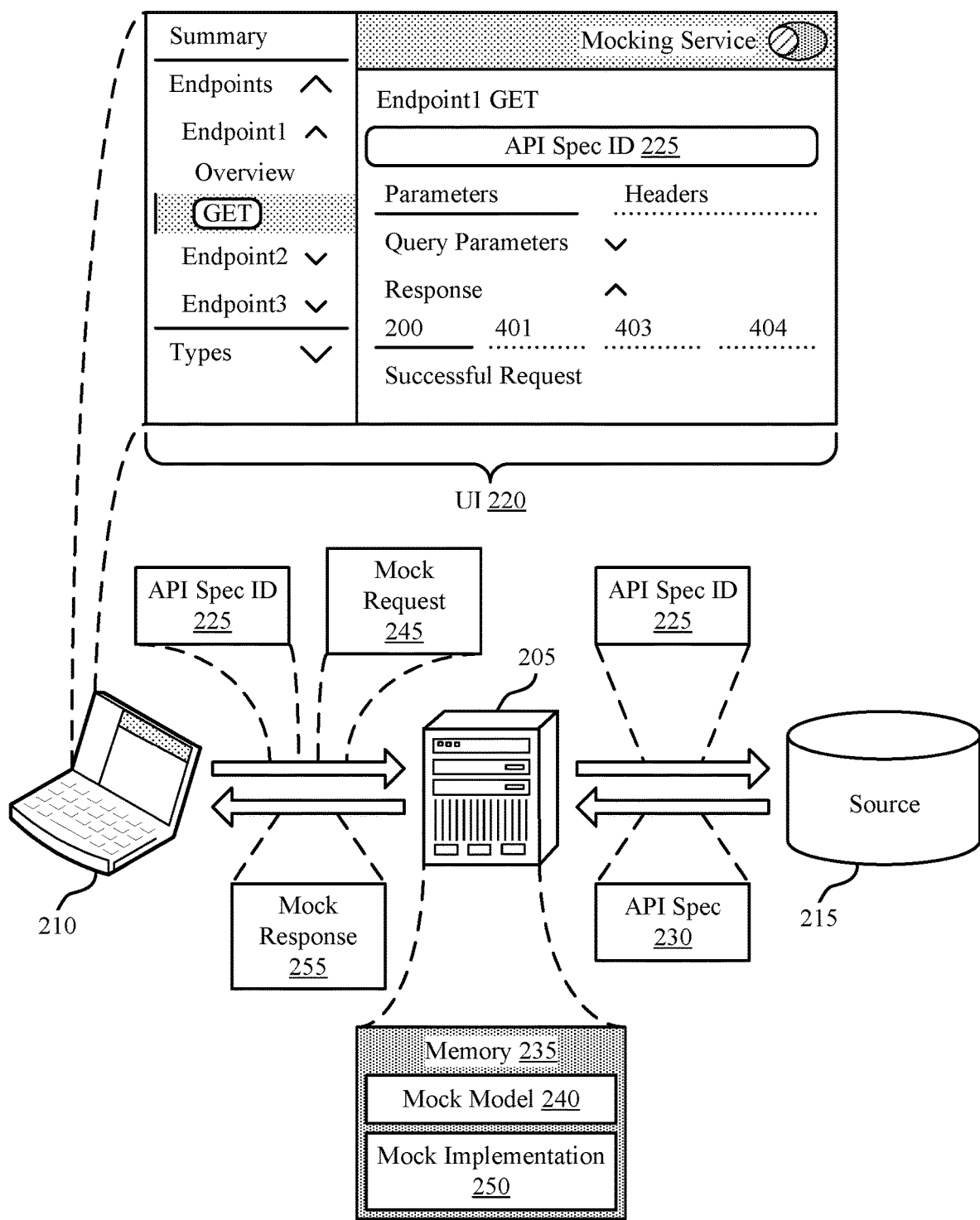
FIGS. 2 and 3 illustrate examples of mocking services that support default mock implementations at a server in accordance with aspects of the present disclosure.

FIG. 2 illustrates an example of a mocking service 200 that supports default mock implementations at a server in accordance with aspects of the present disclosure. The mocking service 200 may include a server 205, which may be an example of a mocking server or application server. This server 205 may be a single server, a server cluster, a container, a virtual machine, or any other device or system for running mock implementations 250 of API specifications 230. The server 205 may receive information from a user device 210 (e.g., via a user interface 220) to generate mock models 240 and execute mock implementations 250. Additionally, in some cases, the server 205 may retrieve API specifications 230 from one or more sources 215. A source 215 may be an example of an internal repository to the server 205 or a system served by the server 205, an external repository to the server 205, a shared code repository, a file upload, a database, a data store, a cloud-based storage entity, or some combination of these or other storage systems. In some cases, the server 205 or user device 210 may operate as the source 215 for an API specification 230.

The mocking service 200 may support secure, efficient API testing and validation. The mocking service user interface 220 may allow a user operating the user device 210 to simulate requests to an API in order to test that the API is functioning properly, troubleshoot problems, and/or to demo the API. For example, the mocking service 200 may expose an endpoint to a user—via the user interface 220—that the user may use for testing an API prior to full implementation (e.g., publishing) of the API. This testing may be based on an API specification 230 and its underlying metadata. An API specification 230, as described herein, may refer to any document or program that defines at least a portion of the functionality of an API (e.g., including any combination of behaviors, definitions, documentation, etc. for the API). The user may validate whether the API is functioning properly based on results of the mocking service 200.

In some cases, the mocking service 200 may be an extension of an API designer application (e.g., an API designer web tool). The API designer application may support a user creating new API specifications 230 and/or editing existing API specifications 230. For example, a user may design an API at the user device 210 in a web tool with a built-in parser. This parser may be specific to an API modeling language (e.g., representational state transfer (REST)ful API modeling language (RAML)) and may parse the user-defined API specification 230 to generate a mock model 240 for the API. The user device 210 may send this pre-parsed mock model 240 to the server 205, and the server 205 may store the mock model 240 in memory 235. To test the API specification 230, the user may input requests to the API in the mocking service user interface 220. If the mocking service 200 is turned on (e.g., a mocking service switch is toggled to indicate that the mocking service 200 is 'ON'), the server 205 may receive the mock request 245 and simulate the request using the pre-parsed mock model 240 in memory. This simulation may be referred to as a mock implementation 250 or mock instance. The server 205 may determine a mock response 255 based on the mock implementation and may return the mock response 255 to the user device 210. This response may be displayed in the user interface 220. For example, the mock response 255 may include one or more hypertext transfer protocol (HTTP) status codes (e.g., "200," "401," "403," and "404" as illustrated in FIG. 2), one or more error messages, or some combination of these responses. In this way, the mocking service 200 may simulate a real implementation of an API but may return a simulated (i.e., "mock") result.

In these cases where the mocking service 200 is built into an API designer tool, a user may validate an API specification 230 created or modified in the API designer tool using feedback from the mocking service 200. Based on the mock response 255 received from the server 205, the user may iterate on the design of the API specification 230, simulate the updated API, receive further feedback, and once more validate whether the API operates as desired. A user may loop through this procedure as many times as necessary within the API designer application prior to publishing the API to test the API specification 230 for errors or bugs. Once satisfied, the user may publish the API for reuse by a wider set of users (e.g., any users, users with specific licenses or authentication tokens, users with certain security credentials, etc.).

In other cases, the mocking service 200 may operate as a standalone service (e.g., independent of an API designer tool, as illustrated in FIG. 2). In these cases, the mocking service 200 may allow a user to input an API specification identifier 225 into a user interface 220. This API specification identifier 225 may indicate an API specification 230 for the server 205 to retrieve from a source 215. Additionally, the API specification identifier 225 may specify how to retrieve the API specification 230 (e.g., the user may provide the source 215 and any authentication needed to access information from the source 215). The format for the API specification identifier 225 may depend on the source 215 of the API specification 230. For example, different sources 215 may use different project identifiers, organization identifiers, version values, or some combination of these or other identification parameters to identify the indicated API (and the corresponding API specification 230). Particular API specification identifier 225 formats for different sources 215 may be documented (e.g., in a public portal) for user access. Based on the API specification identifier 225 received from the user device 210, the server 205 may retrieve the indicated API specification 230 from the corresponding source 215. Alternatively, the user may upload the API specification 230 directly to the server 205. In such an example, the user device 210 may be regarded as the source 215 of the API specification 230, and the API specification identifier 225 may be an explicit or implicit indication that the information provided to the mocking service 200 from the user includes the API specification 230 for simulation.

The server 205 may then parse the retrieved API specification 230 on-the-fly in memory 235. In some cases, the server 205 may contain a universal parser to handle API specifications 230 written using multiple different API design languages. For example, the universal parser may be an example of an API modeling framework (AMF) parser internal to the server 205. The server 205 may parse the API specification 230 to generate a mock model 240 for the API and may persist the mock model 240 in memory 235. This specification parsing process may be transparent to the user providing the API specification identifier 225.

The user may simulate mock requests 245 to this mock model 240 via the user interface 220. An API request may be formatted as a link to a particular URL and may include an endpoint, a method, one or more headers, and a set of data (i.e., the body of the request). For example, as illustrated in FIG. 2, the user may select "Endpoint1" as the endpoint for the mock request 245 in the user interface 220 and may test a "GET" method. Other methods supported by the mocking service 200 may include "PUT," "POST," "PATCH," "DELETE," or some combination of these or other API methods. A mock request 245 may include all or a subset of the parameters of a regular API request. For example, in some cases, a mock request 245 may not include data, and instead the API specification 230 may define values to use as mock data when performing testing on the API. To handle a mock request 245 sent by the user device 210, the server 205 may generate a mock implementation 250 of the API based on the mock request 245. This mock implementation 250 (i.e., a mock instance) may simulate the API handling and responding to such an API request, and may be temporarily cached in memory 235 at the server 205. To securely test the API, the server 205 may run the mock implementation 250 of the API internal to the server 205 without any database access. This may prevent the server 205 from altering any data at a database when the mocking service 200 is activated. Further, running the mock implementation 250 internal to the server 205 may reduce the processing time for the mock instance (e.g., as compared to mocking procedures that use external connections to retrieve information during the mocking procedures).

Running the mock implementation 250 based on the mock request 245 may result in a mock response 255. This mock response 255 may simulate an API response to an API request containing the same or similar parameters as the mock request 245. As such, this mock response 255 may be based on information in the API specification 230 (e.g., methods, data types, parameters, metadata, etc.). The server 205 may transmit the mock response 255 to the user device 210 in response to the mock request 245. The user device 210 may display the mock response 255 in the user interface 220. For example, as illustrated, the user interface 220 may display a mock response 255 with an HTTP status code of "200," indicating that the mock model 240 successfully handled the mock request 245. Other mock responses 255 may indicate problems with handling a mock request 245 using HTTP status codes, error messages, or both. These mock responses 255 may additionally indicate where the problem may have occurred (e.g., a status code in the 400s may indicate an error originating from the client, such as user device 210, while a status code in the 500s may indicate an error originating from the server 205). Based on the mock response 255 displayed in the user interface 220, the user may determine how to modify an API, an API specification 230, or an API request. By handling API specification 230 parsing and mock implementations 250 internally at the server 205, the mocking service 200 may support robust API simulations across multiple API design languages and sources 215. The mocking service may provide a mocking service console which is visually displayed via the user interface 220. The mocking service console may handle exchanging messages between the user device 210 and the mocking server 205.

The mocking server 205 providing the mocking service 200 may store some default or pre-configured mock models in the server memory 235 for various services or commonly used APIs. The mocking server 205 or a testing console at the user device 210, or both, may detect the use of the additional service and determine that the server 205 has a corresponding default mock model 240 stored in the server memory 235. Thus, the user may not have to specify or implement a mock model 240 for the service, and the platform console and the server 205 may autonomously run a pre-configured mock implementation 250 for the service. The testing console may work together with the predefined mocks when the mocking service is on (e.g., identifying when to use a default mock model 240), and the user may not have to provide any additional information or perform any additional actions to run a mock implementation 250 of the API.

When a user requests to run a mock implementation 250 for an API with an API specification 230 that uses a complementary service, the user device 210 (e.g., the console of the mocking service 200 running on the user device 210), the server 205, or both may detect the complementary service based on metadata of the API specification 230. The console may handle sending a mock request 245 to run a mock implementation 250 of a default parsed mock model 240 for the complementary service which is stored in the server memory 235 at the mocking server 205. As this default parsed mock model 240 is already cached at the server 205, the server 205 may refrain from parsing an API specification 230 for the complementary service at runtime, reducing the processing overheard associated with testing an API. The mocking server 205 may provide a credential or certificate for the user (e.g., in the mock response 255) based on running the default mock implementation 250 for the complementary service. The user device 210 may then transmit a mock request 245 to run a mock implementation 250 for the API (e.g., uninterrupted) after the server 205 runs the mock implementation 250 for the complementary service. For example, the server 205 may run the mock implementation 250 of the API based on the provided user credential or certificate. The mock implementation 250 for the API may run as expected by the user based on the mocking service console requesting to run the pre-configured mock implementation 250 of the complementary service. The user may not be prompted to provide any additional information or models (e.g., beyond the API specification identifier 225 or API specification 230) for the mocking service 200 to run a mock implementation 250 of the API, even if the API calls for the server 205 to run one or more additional services.

The techniques described herein may also be applied to demonstrate the mocking service. For example, the mocking server 205 may store some default mock models 240 in the server memory 235 which are examples of parsed models of default or sample APIs. The user device 210 may be able to transmit a mock request 245 to run a mock implementation 250 of one of the default mock models 240 just to demonstrate the functionality of the mocking service 200. The mocking server 205 may expose an endpoint of the default mock implementation 250 on the user interface 220 at the user device 210, and a user may operate the user device 210 to test the sample API. By using this technique, a user may be able to test the mocking service 200 without having to provide an API specification 230, API specification identifier 225, or parsed model. Instead, the user may test one of the pre-configured, sample APIs locally cached in memory 235 at the server 205.

Figure 3:
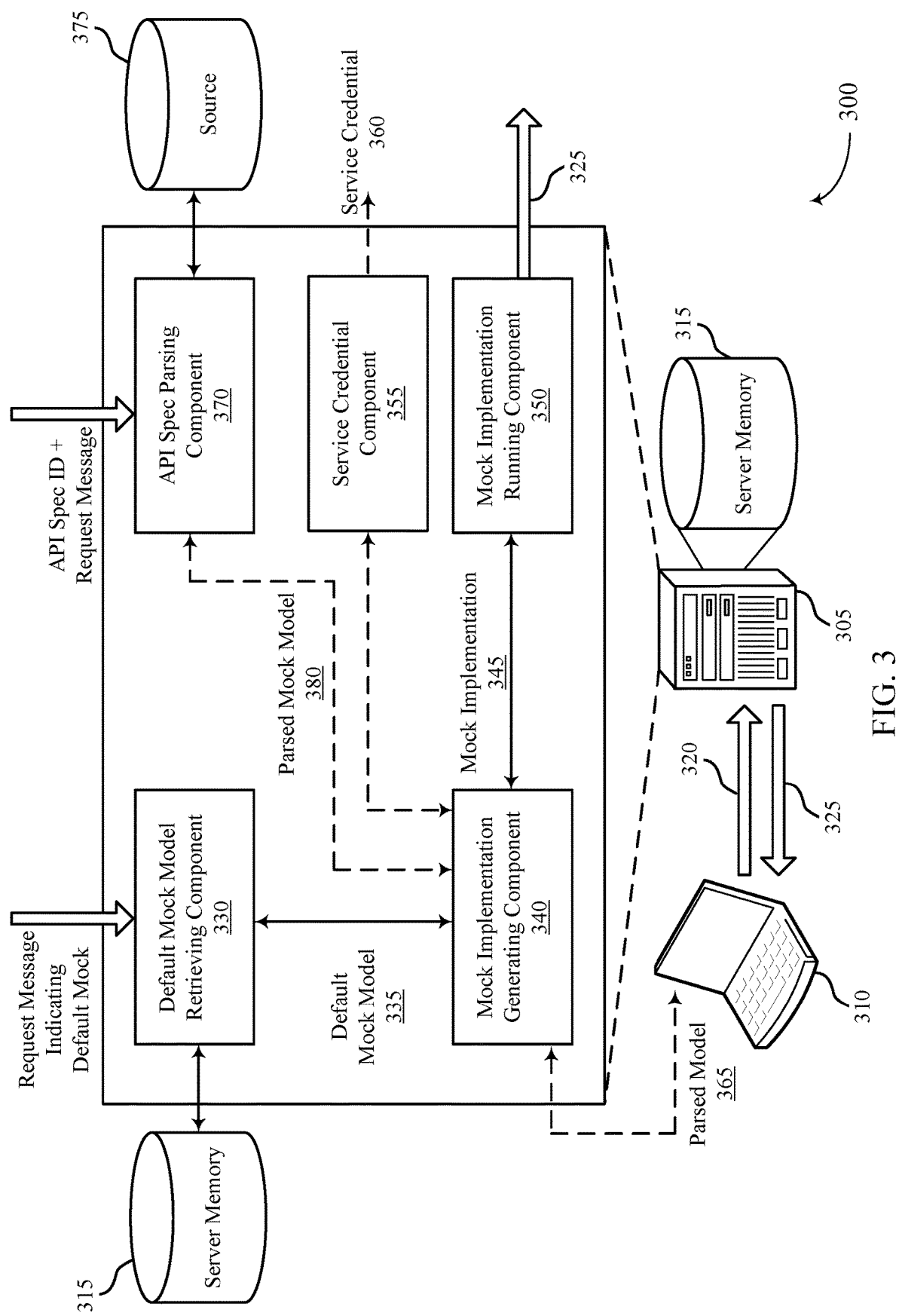

FIG. 3 illustrates an example of a mocking service 300 that supports default mock implementations at a server in accordance with aspects of the present disclosure. The mocking service 300 may include a server 305, which may be an example of a mocking server or application server as described in FIG. 2. The server 305 may be configured to run mock implementations 345 of API specifications and pre-configured mock implementations for various services. The server 305 may receive information from a user device 310 (e.g., via a user interface) to generate mock models and execute mock implementations 345. A user operating the user device 310 may interact with the console through the user interface to exchange information with (e.g., send mocking requests 320 to and receive mocking responses 325 from) the mocking server (e.g., the server 305).

The user facilitating the user device 310 may test an API specification for an API which utilizes an additional service. For example, the API may specify an authentication service such as OAuth1, OAuth2, Open Banking, or any other authentication service. In some cases, a schema (e.g., a RAML schema) of an API specification may indicate the authentication service used for the corresponding API. The user may be requested to complete a security workflow when testing the API through the platform's console. In some cases, the user must provide an implementation of the authentication service when running an implementation of the API, even when the implementation is a mock implementation 345 running through the mocking service.

The mocking server 305 may provide some default mock implementations for commonly used services. These default mock implementations may be run based on default mock models 335 pre-configured and stored in the server memory 315 (e.g., locally cached in persistent memory). The default mock models 335 may not be retrieved or generated at the server 305 based on a source 375 or an API specification. Instead, the default mock models 335 may be bundled with the mocking service 300, such that the mocking server 305 is initially configured with these predefined default mock models 335. The server 305 or platform console (e.g., at the user device 310), or both, may detect the use of an additional service by an API, determine that the server 305 has a default mock model 335 corresponding to the service stored in the server memory 315, and run a pre-configured mock implementation for the service. Using these techniques, the user may not have to specify, provide, or implement a mock model for the service. The console may handle requesting to run the pre-configured mock implementation corresponding to the service so that the user can test the associated API without interruption.

In some cases, the mocking server 305 may store some default mock models 335 for sample APIs. The user device 310 may transmit a mocking request 320 to run a mock implementation 345 for a default mock model 335 corresponding to one the sample APIs to demonstrate or check the features of the mocking service 300. The default mock models 335 for the sample APIs may be publicly accessible and usable by multiple different tenants of the mocking server 305.

In an example, the user may prepare to run a mock implementation 345 for an API specification at the user device 310. The API specification may be stored in memory at the user device 310 or stored in memory at a source 375 and retrieved from the source 375 by the user device 310 or the server 305. Using a user interface for the API mocking service at the user device 310, the user may provide the API specification to the console for the mocking service platform. The user may prepare to run a mock implementation for the API of the API specification.

The user may turn the mocking service "on" (e.g., by using a toggle on the user interface) at the user device 310. The console at the user device 310 may identify the API specification which the user is preparing to mock. The console may identify a service associated with the API specification based on metadata of the API specification. For example, the API specification, or its metadata, may indicate that the API utilizes an authentication service.

If the mocking service is "off" or if a default mock implementation configuration is "off," the server 305 may request the user to complete a security workflow for the authentication service. However, if the mocking service is "on," the console of the mocking service at the user device 310 may determine to run a default mock implementation of the service at the server 305. The console may have an up-to-date list of the default mocks or pre-configured mocks which are available in the server memory 315 at the server 305. Therefore, when the console identifies the additional service, the console may prepare to run a default mock implementation of the additional service. The console may automatically make the determination such that the user is not prompted or requested to provide any additional information, API specifications, or mock models. The console may handle requesting to run the default mock implementation at the server 305.

The console at the user device 310 may transmit, in a mocking request 320 to the server 305, a first request message indicating the default mock implementation of the service. The first request may be received by a default mock model retrieving component 330 at the server 305. The default mock model retrieving component 330 may identify a default mock model 335 of the API stored in the server memory 315 of the server 305 based on the first request message. The server 305 may store multiple different default mock models 335 for popular or commonly used services. The default mock models 335 may be configured at the server 305 for common implementation across multiple users. For example, the default mock model 335 retrieved based on the first request message may also be accessible by a second user corresponding to a second tenant of the server 305 (not shown). These default mock models 335 may be, in some cases, publicly accessible. For example, a user may request to run a default mock implementation by accessing a website hosted by the server 305 via visiting a URL on a web browser.

The default mock model retrieving component 330 may send the default mock model 335 for the service to a mock implementation generating component 340. The mock implementation generating component 340 may generate the default mock implementation of the API based on the default mock model 335.

The server 305 may provide the default mock implementation for the API to the mock implementation running component 350. The mock implementation running component 350 may be configured to run, in the server memory 315 of the server 305, the default mock implementation of the API according to the first request message. In some cases, the default mock implementation of the API may run in the background of the mocking server platform.

Running the default mock implementation of the API may generate a service credential 360 for the API. For example, if the service associated with the default mock implementation is an authentication service, running the default mock implementation may generate an authentication credential. The service credential component 355 may provide the service credential 360 to the user device 310 based on successfully running the default mock implementation, for example in a mocking response 325.

Receiving the service credential 360 for a service may enable the user device 310 to run a mock implementation of an API which specifies that service. In some cases, the console may transmit the first request upon activation of the mocking service. In some other examples, the console may transmit the first request upon detecting the user device 310 initiating a second request to run a mock implementation for the API specification which uses the service. Under any condition, by obtaining the service credential 360, the console may seamlessly support transmitting, to the server 305, a second request message indicating a mock implementation of the API which uses the service. That is, the console may need authentication to send the second request indicating the mock implementation of the API. By performing the mock authentication procedure (e.g., based on a default mock model 335 in memory 315), the console may determine that it is authorized to transmit the request for the mock implementation of the API following successful completion of a mock security workflow.

The server 305 may support running a non-default mock implementation of an API, which may be developed or tested by a user facilitating the user device 310. The user device 310 may provide either an API specification for the API or a parsed model 365 of the API specification. In some cases, the user device 310 may transmit a second request message including an API specification identifier. The server 305 may retrieve the API specification from a source 375 which stores the API specification. The source 375 may be an example of an internal repository to the server 305 or a system served by the server 305, an external repository to the server 305, a shared code repository, a file upload, a database, a data store, a cloud-based storage entity, or some combination of these or other storage systems. Some examples of internal platform sources may include a Version Control System (VCS), an Exchange system, an API Manager (e.g., MuleSoft VCS, MuleSoft Exchange, MuleSoft API Manager), or other types of internal storage sources, systems, or services. Some examples of external platform sources may include a file upload, a shared code repository such as GitHub, or other types of external storage sources, systems, or services. In some cases, the server 305 or user device 310 may operate as the source 375 for an API specification.

Once the server 305 has obtained the API specification, the server 305 may parse the API specification in memory at the server 305. For example, the API specification parsing component 370 may parse the API specification into a parsed mock model 380. The API specification may be written in one of multiple different API specification languages. By parsing the API specification at the server, the server 305 may be capable of generating a mock implementation for an API specification written in any of multiple API specification languages. The parsed mock model 380 may be stored in the server memory 315 at the server 305. In some cases, the parsed mock models 380 may be temporarily stored in the server memory 315 and flushed periodically, aperiodically, or based on some formula, while the default mock models 335 may be maintained in server memory 315 and may not be removed.

The server 305 may generate a mock implementation 345 of a parsed mock model 380 by processing the parsed mock model 380 at the mock implementation generating component 340. The mock implementation generating component 340 may generate a mock implementation 345 for the API, and the server 305 may use a mock implementation running component 350 to run, in the memory of the server, the mock implementation 345 of the API according to the request message. For example, the mock implementation running component 350 may expose the mock implementation 345, or an endpoint of the mock implementation 345, such that a user (e.g., the user operating the user device 310) can test and validate the API based on the mock implementation 345. In some cases, the user may test, validate, or demonstrate the API via the mock implementation 345 prior to launching the API or prior to a real implementation of the API. The server 305 may provide the mocking results in a mocking response 325 to the user device 310. The mocking results may be displayed on the user interface at the user device 310. In some cases, the user of the user device 310 may interact with the user interface at the user device 310 to test and use the mock API implementation.

In some cases, the server 305 may perform a final validation of the default mock model 335 or the parsed mock model 380 prior to generating or running the corresponding mock implementation 345. For example, the server 305 may verify that the API specification, the mock model (e.g., parsed or default), or the mock implementation 345, or any combination thereof, did not include errors that may negatively affect or terminate execution of the mock implementation 345 based on the received request.

By implementing the techniques herein, the server 305 may not require the user device 310 to provide a default mock implementation for a complementary service of an API. The default mock models 335 may be stored and executed in memory 315 at the mocking server 305, which may increase performance of running the mock implementation 345, as the server 305 may not have to wait for communicating with a database or a source 375 to determine the default mock models 335. Furthermore, using a single default mock model 335 to serve a large number of tenants or users may efficiently utilize resources at the server 305. For example, rather than receiving API specification or mock model information for a same authentication service from multiple different users when running mock implementations 345, processing each of these sets of information separately, and storing separate parsed mock models 380 for each user for the same service, the server 305 may efficiently store the default mock model 335 to handle running the mock implementations 345 for each of these users. The mocking service 300 may also be configured to add new or additional default mock implementations, storing default mock models 335 for the new or additional default mock implementations in the server memory 315. Thus, if a new edition of a security configuration is released, the new edition may also be provided as an out-of-the-box mock implementation by the mocking service 300.

The components of the server 305 discussed herein may be implemented in hardware, software executed by a processor, firmware, or any combination thereof. These components may be physically located at various positions, including being distributed such that portions of functions are implemented at different physical locations by one or more physical devices. Additionally, the server 305 may include any combination of these components or additional components related to storing default mock models 335 and efficiently running default mock implementations at the server 305.

Figure 4:
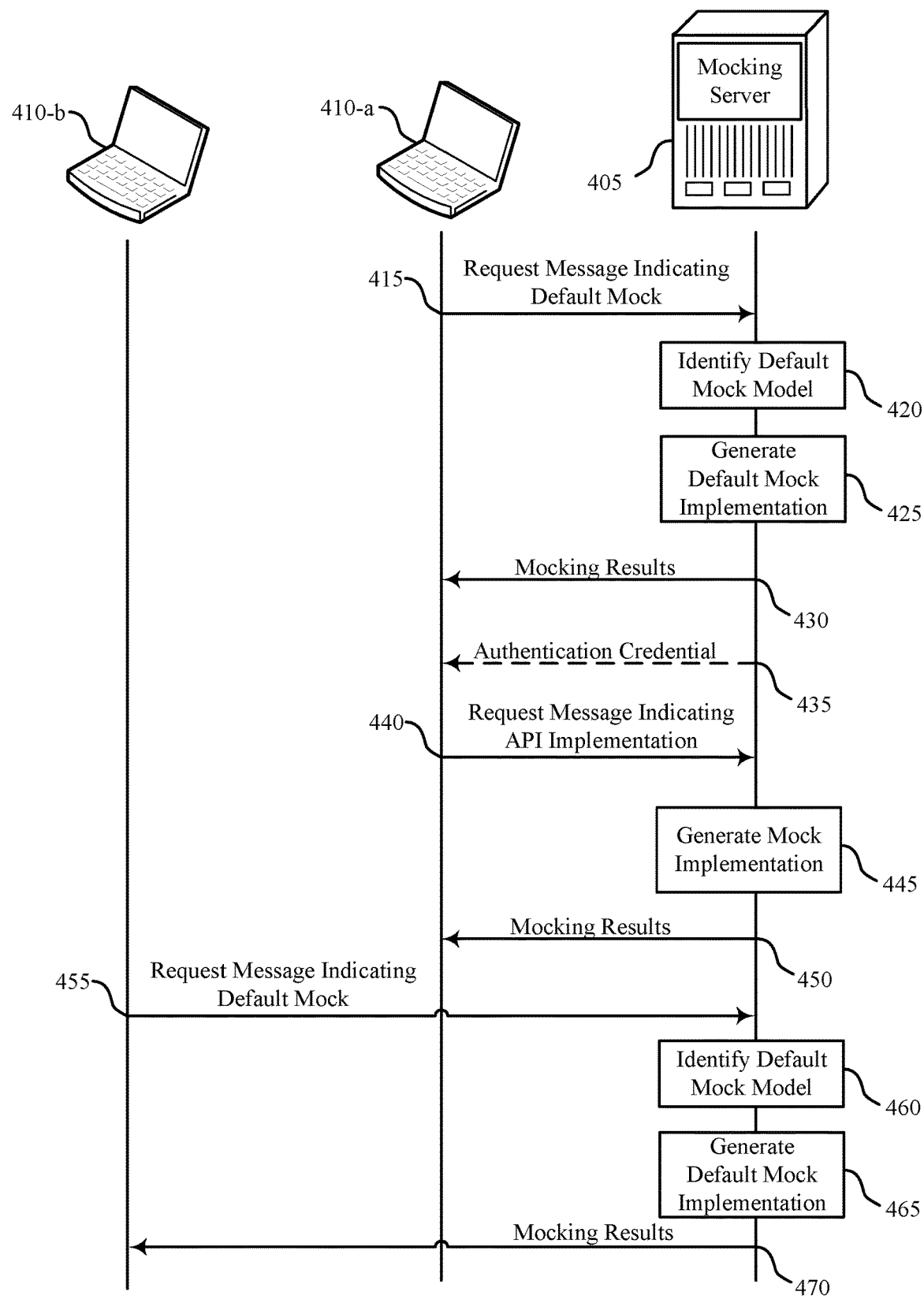
FIG. 4 illustrates an example of a process flow that supports default mock implementations at a server in accordance with aspects of the present disclosure.

FIG. 4 illustrates an example of a process flow 400 that supports default mock implementations at a server in accordance with aspects of the present disclosure. The process flow 400 may include a server 405, user device 410-a, and user device 410-b. The server 405 may be an example of a mocking server or a server 205 or 305 as described in FIGS. 2 and 3. The user devices 410 may each be an example of a user device 210 or a user device 310 as described in FIGS. 2 and 3. Alternative examples of the following may be implemented, where some steps are performed in a different order than described or are not performed at all. In some cases, steps may include additional features not mentioned below, or further steps may be added.

User device 410-a may prepare to run a mock implementation for an API. The API may specify that it uses an additional service, such as an authentication service. The API may be documented in an API specification, which may be stored in memory at user device 410-a or another storage repository, referred to as a source. A console for the mocking service at user device 410-a may identify the API specification for the API. The console may identify a service associated with the API specification based on metadata of the API specification. For example, the service associated with the API specification may be an authentication service, which the user device 410-a may have to implement in order to request execution of a mock implementation for the API specification. The console at user device 410-a may have an up-to-date list of the default mock implementations provided by the mocking service, and the console for the mocking service at user device 410-a may determine that the mocking service has a pre-configured mock model stored in memory at the server 405 corresponding to a service indicated or called in the API specification.

The console at user device 410-*a* may determine to run a default mock implementation of the service (e.g., an API) at the server 405. At 415, the console at user device 410-*a* may transmit, to the server 405, a first request message indicating the default mock implementation of the service. The server 405 may receive, from user device 410-*a*, the first request message indicating the default mock implementation of the service.

At 420, the server 405 may identify a default mock model of the service stored in memory of the server 405 based on the request message. The default mock model may be pre-configured at the server for common implementation across multiple users (e.g., including at least user device 410-*a* and user device 410-*b*). At 425, the server 405 may generate the default mock implementation of the service based on the default mock model.

The server 405 may run, in the memory of the server, the default mock implementation of the service according to the request message. At 430, the server 405 may provide the mocking results to user device 410-*a*. In some cases, at 435, the server 405 may provide, to user device 410-*a*, a service credential for the service based on running the default mock implementation (e.g., if the default mock implementation performs a simulated security workflow). For example, the server 405 may provide an authentication credential for the service, where the service is a security service or an authentication service.

In some cases, the requests to run the default mock implementation for the service may occur in the background of the mocking service. The console at user device 410-*a* may detect that the API specification utilizes the additional service, and the console may handle requesting to run the default mock implementation for the service (e.g., without interrupting or requiring additional information or input from the user facilitating user device 410-*a*). Thus, the console at user device 410-*a* may then transmit, to the server 405, a second request message indicating a mock implementation of the API at 440. The console at user device 410-*a* may seamlessly handle providing an implementation for the service so that execution of the API mock implementation is unaffected. At 445, the server 405 may generate a mock implementation for the API and may run the mock implementation. By running the mock implementation of the API, the server 405 may expose an endpoint of the API which can be used for testing and validating, for example before an official release of the API. At 450, the server 405 may send the mocking results to user device 410-*a* (e.g., based on running the mock implementation). For example, results of the mock implementation of the API may be displayed on a user interface at user device 410-*a*. A user facilitating user device 410-*a* may be able to interact with the user interface to test functionality of the API via the mock implementation of the API.

In some cases, the server 405 may retrieve the API specification directly from user device 410-*a*, such as by a file upload. In some examples, user device 410-*a* may transmit an identifier for the API specification with the mocking request, and the server 405 may retrieve the API specification from a source based on the identifier. The source may be, for example, an internal storage repository, an external storage repository, a shared code repository, etc.

The mock implementation of the service may be configured to be accessible by multiple different users corresponding to multiple different tenants of the mocking server 405. For example, a user device 410 may transmit a URL indicating the default mock implementation of the service as a mocking request to run the default mock implementation of the service.

In an example, at 455, user device 410-*b* may transmit, to the server 405, an additional request message indicating the default mock implementation of the service, where user device 410-*a* is associated with a first user of a first tenant and user device 410-*b* is associated with a second user of a second tenant. At 460, the server may identify the default mock model of the service stored in memory of the server 405 based on the additional request message. The server 405 may generate an additional default mock implementation of the service based on the default mock model at 465. The server 405 may run, in the memory of the server 405, the additional default mock implementation of the service according to the additional request message. At 470, the server 405 may transmit mocking results for running the additional default mock implementation of the service to user device 410-*b*. Thus, both user device 410-*a* and user device 410-*b* are able to run a default mock implementation for the same default mock API or default mock service stored at the mocking server 405. This reuse of a default mock model configured at the mocking service 405 may be an efficient use of memory and processing resources by the server 405, especially if the server 405 serves multiple different users, tenants, user devices 410, or some combination thereof.

Figure 5:
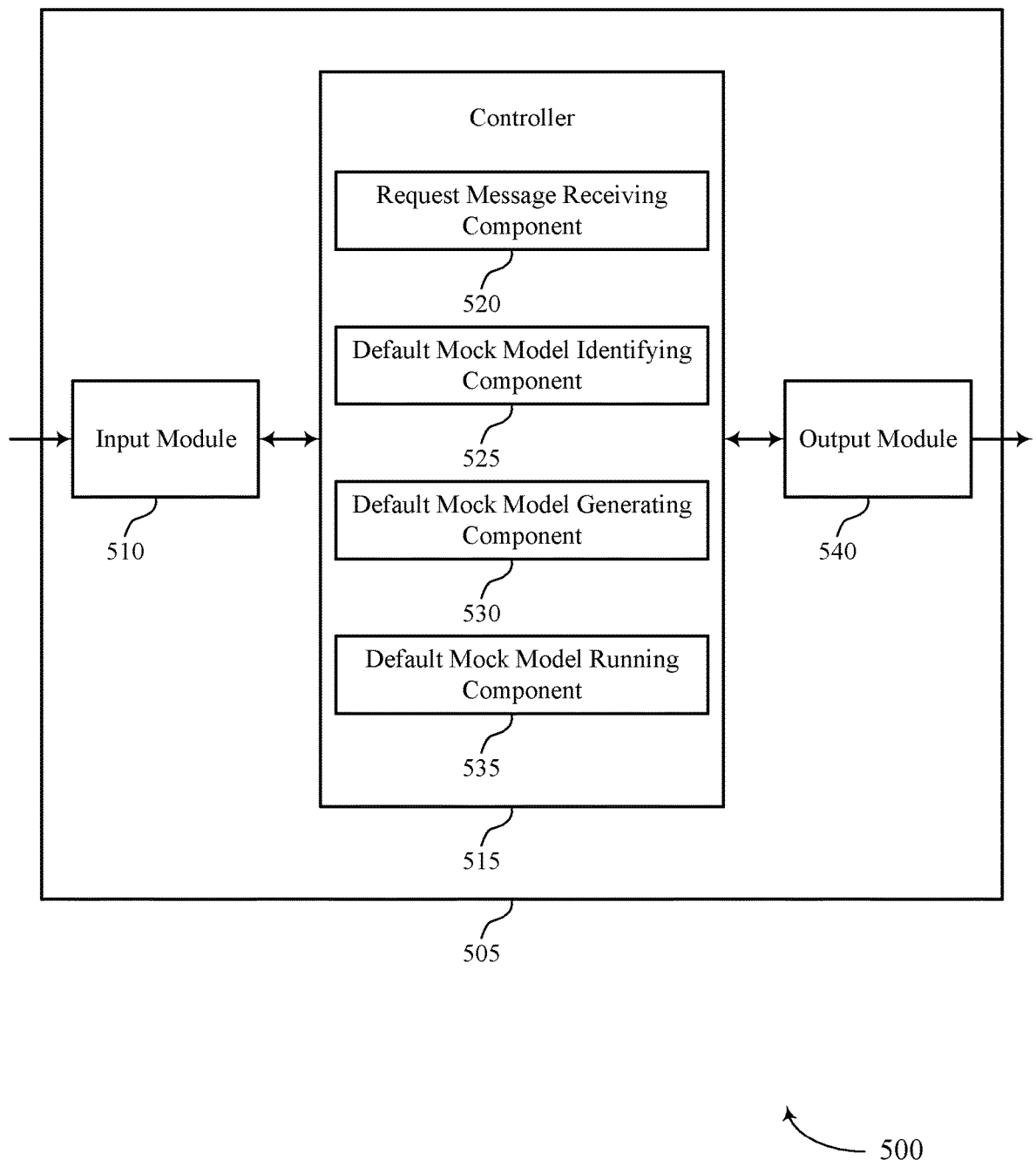
FIG. 5 shows a block diagram of an apparatus that supports default mock implementations at a server in accordance with aspects of the present disclosure.

FIG. 5 shows a block diagram 500 of an apparatus 505 that supports default mock implementations at a server in accordance with aspects of the present disclosure. The apparatus 505 may include an input module 510, a controller 515, and an output module 540. The apparatus 505 may also include a processor. Each of these components may be in communication with one another (e.g., via one or more buses). In some cases, the apparatus 505 may be an example of a user terminal, a database server, or a system containing multiple computing devices. For example, the apparatus 505 may be a component of a server hosting a mocking service.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the controller 515 to support default mock implementations. In some cases, the input module 510 may be a component of an input/output (I/O) controller 715 as described with reference to FIG. 7.

The controller 515 may include a request message receiving component 520, a default mock model identifying component 525, a default mock model generating component 530, and a default mock model running component 535. The controller 515 may be an example of aspects of the controller 605 or 710 described with reference to FIGS. 6 and 7.

The controller 515 and/or at least some of its various sub-components may be implemented in hardware, software executed by a processor, firmware, or any combination thereof. If implemented in software executed by a processor, the functions of the controller 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The controller 515 and/or at least some of its various sub-components may be physically located at various positions, including being distributed such that portions of functions are implemented at different physical locations by one or more physical devices. In some examples, the controller 515 and/or at least some of its various sub-components may be a separate and distinct component in accordance with various aspects of the present disclosure. In other examples, the controller 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The controller 515 may test an API at a server. For example, the request message receiving component 520 may receive, from a user device, a request message indicating a default mock implementation of the API. The default mock model identifying component 525 may identify a default mock model of the API stored in memory of the server based on the request message, where the default mock model is pre-configured at the server for common implementation across a set of users. The default mock model generating component 530 may generate the default mock implementation of the API based on the default mock model. The default mock model running component 535 may run, in the memory of the server, the default mock implementation of the API according to the request message.

The output module 540 may manage output signals for the apparatus 505. For example, the output module 540 may receive signals from other components of the apparatus 505, such as the controller 515, and may transmit these signals to other components or devices. In some specific examples, the output module 540 may transmit output signals for display in a user interface, for storage in a database or data store, for further processing at a server or server cluster, or for any other processes at any number of devices or systems. In some cases, the output module 540 may be a component of an I/O controller 715 as described with reference to FIG. 7.

Figure 6:
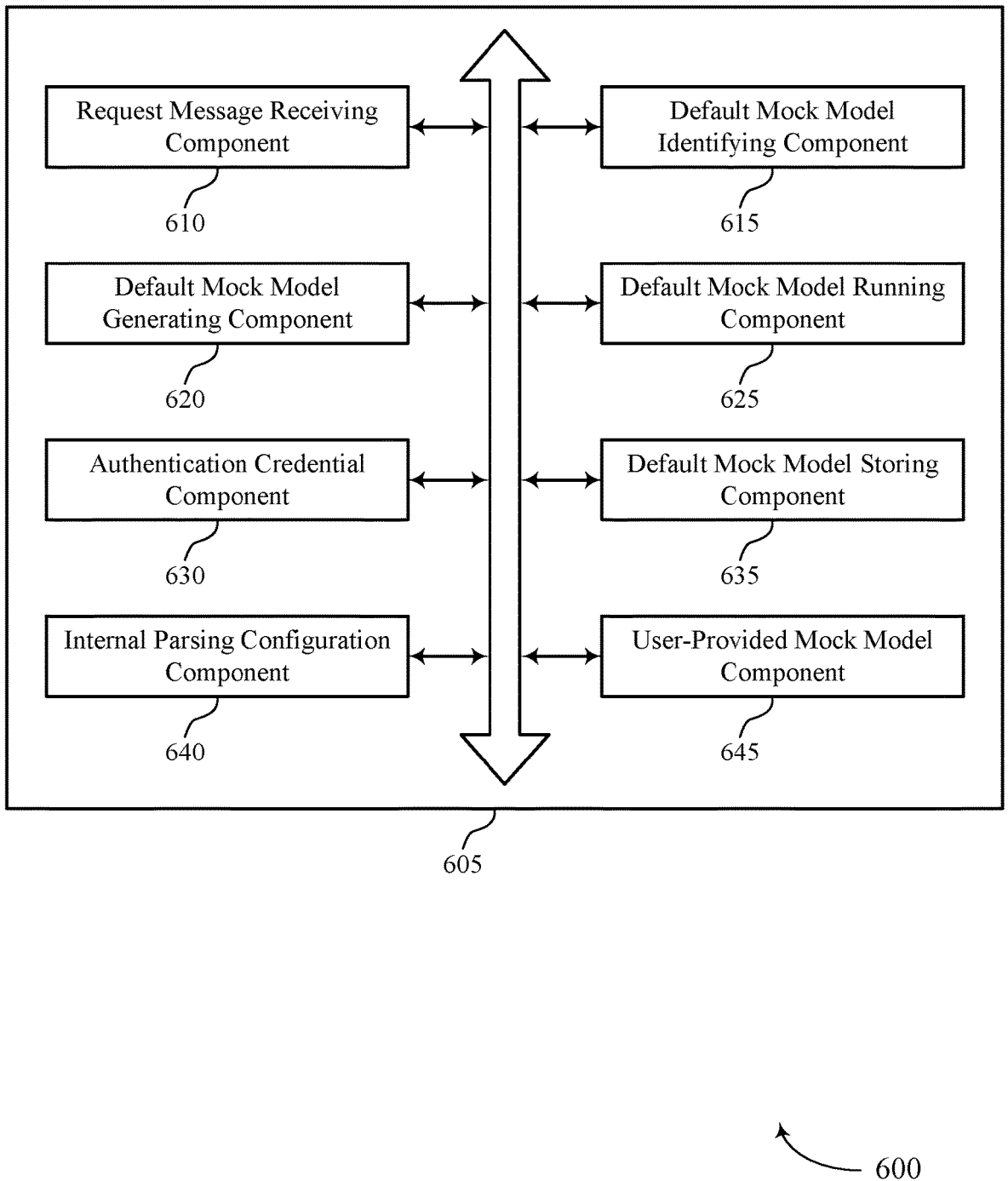
FIG. 6 shows a block diagram of a controller that supports default mock implementations at a server in accordance with aspects of the present disclosure.

FIG. 6 shows a block diagram 600 of a controller 605 that supports default mock implementations at a server in accordance with aspects of the present disclosure. The controller 605 may be an example of aspects of a controller 515 or a controller 710 described herein. The controller 605 may include a request message receiving component 610, a default mock model identifying component 615, a default mock model generating component 620, a default mock model running component 625, an authentication credential component 630, a default mock model storing component 635, an internal parsing configuration component 640, and a user-provided mock model component 645. Each of these modules may communicate, directly or indirectly, with one another (e.g., via one or more buses). The controller 605 may test an API at a server.

The request message receiving component 610 may receive, from a user device, a request message indicating a default mock implementation of the API. In some examples, the request message receiving component 610 may receive, from an additional user device, an additional request message indicating the default mock implementation of the API, where the additional user device is associated with a second user of a second tenant. In some cases, the request message indicates a URL corresponding to the default mock implementation.

The default mock model identifying component 615 may identify a default mock model of the API stored in memory of the server based on the request message, where the default mock model is pre-configured at the server for common implementation across a set of users. In some examples, the default mock model identifying component 615 may also identify the default mock model of the API stored in memory of the server based on the additional request message.

The default mock model generating component 620 may generate the default mock implementation of the API based on the default mock model. In some examples, the default mock model generating component 620 may generate an additional default mock implementation of the API based on the default mock model.

The default mock model running component 625 may run, in the memory of the server, the default mock implementation of the API according to the request message. In some examples, the default mock model running component 625 may run, in the memory of the server, the additional default mock implementation of the API according to the additional request message.

The authentication credential component 630 may provide, to the user device, an authentication credential for the API based on running the default mock implementation if the API is a security service. The default mock model storing component 635 may receive a new default mock model of a new API. In some examples, the default mock model storing component 635 may store the new default mock model of the new API in the memory of the server.

The internal parsing configuration component 640 may receive, from an additional user device, an identifier indicating an API specification for an additional API. In some examples, the internal parsing configuration component 640 may retrieve the API specification from a source external to the server based on the identifier. In some examples, the internal parsing configuration component 640 may parse, in the memory of the server, the API specification to determine a parsed model for the API specification.

In some examples, the internal parsing configuration component 640 may receive, from the additional user device, an additional request message indicating a mock implementation of the additional API. In some examples, the internal parsing configuration component 640 may generate the mock implementation of the additional API based on the parsed model for the API specification. In some examples, the internal parsing configuration component 640 may run, in the memory of the server, the mock implementation of the additional API according to the additional request message.

The user-provided mock model component 645 may receive, from an additional user device, a mock model for an API specification for an additional API. In some examples, the user-provided mock model component 645 may receive, from the additional user device, an additional request message indicating a mock implementation of the additional API. In some examples, the user-provided mock model component 645 may generate the mock implementation of the additional API based on the mock model for the API specification. In some examples, the user-provided mock model component 645 may run, in the memory of the server, the mock implementation of the additional API according to the additional request message.

Figure 7:
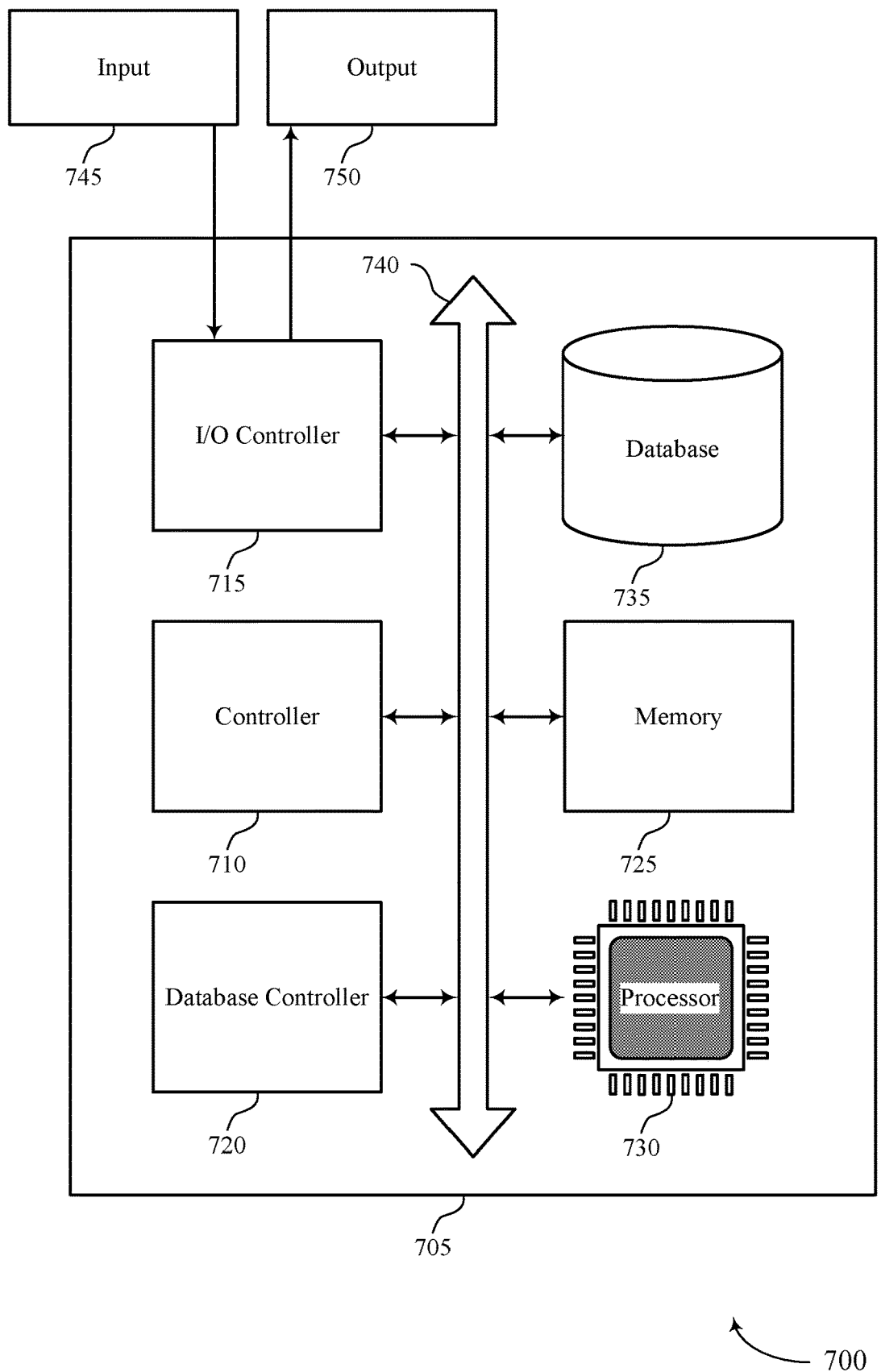
FIG. 7 shows a diagram of a system including a device that supports default mock implementations at a server in accordance with aspects of the present disclosure.

FIG. 7 shows a diagram of a system 700 including a device 705 that supports default mock implementations at a server in accordance with aspects of the present disclosure.

The device 705 may be an example of or include the components of an application server (e.g., a mocking server) or an apparatus 505 as described herein. The device 705 may include components for bi-directional data communications including components for transmitting and receiving communications, including a controller 710, an I/O controller 715, a database controller 720, memory 725, a processor 730, and a database 735. These components may be in electronic communication via one or more buses (e.g., bus 740).

The controller 710 may be an example of a controller 515 or 605 as described herein. For example, the controller 710 may perform any of the methods or processes described above with reference to FIGS. 5 and 6. In some cases, the controller 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting default mock implementations at a server).

Figure 8:
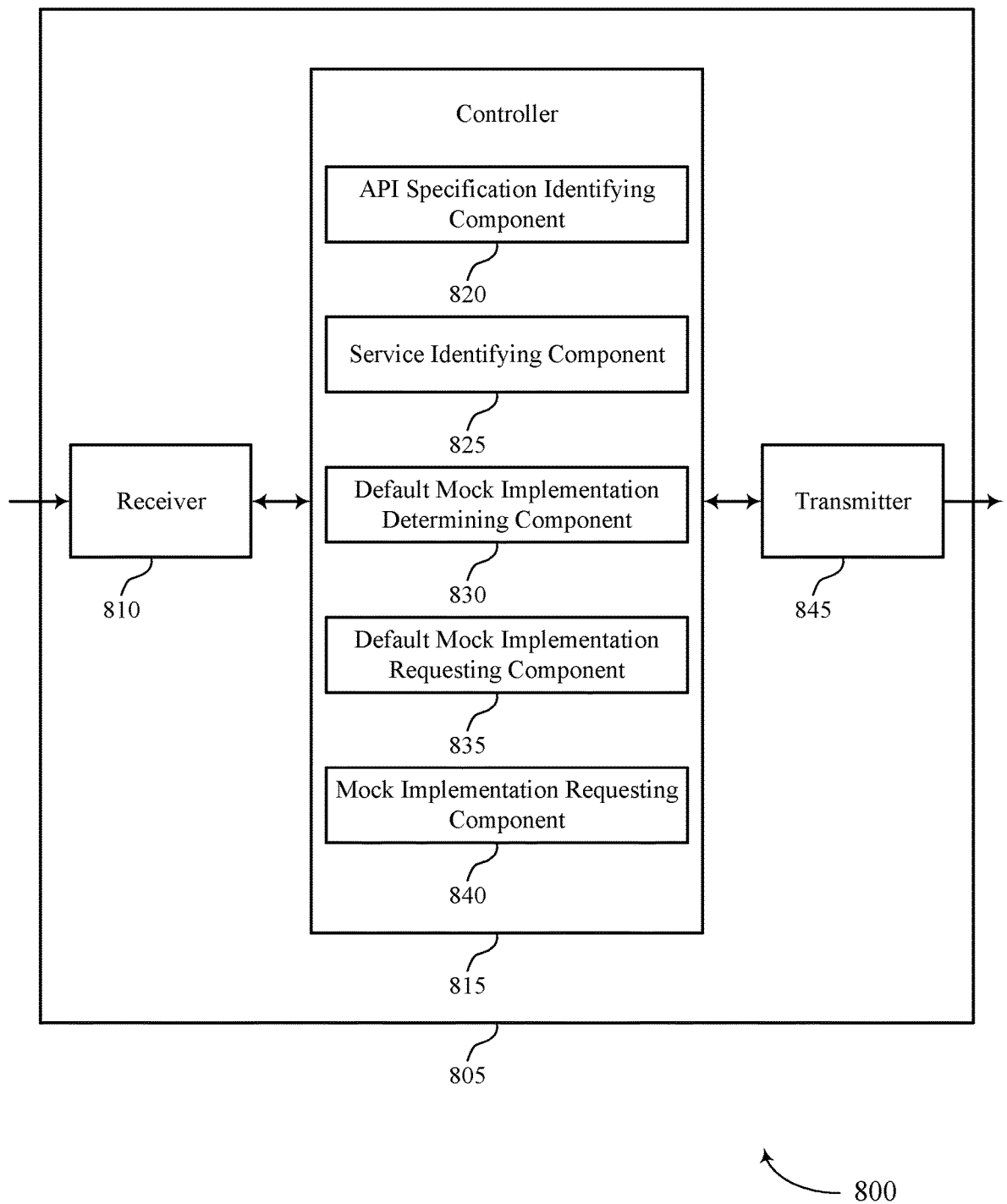
FIG. 8 shows a block diagram of a device that supports default mock implementations at a server in accordance with aspects of the present disclosure.

FIG. 8 shows a block diagram 800 of a device 805 that supports default mock implementations at a server in accordance with aspects of the present disclosure. The device 805 may include a receiver 810, a controller 815, and a transmitter 845. The device 805 may also include a processor. Each of these components may be in communication with one another (e.g., via one or more buses). In some cases, the device 805 may be an example of a user device as described herein.

The receiver 810 may receive information such as packets, user data, or control information associated with various information channels (e.g., control channels, data channels, and information related to default mock implementations at a server, etc.). Information may be passed on to other components of the device 805. The receiver 810 may be an example of aspects of the transceiver 1020 described with reference to FIG. 10. The receiver 810 may utilize a single antenna or a set of antennas.

The controller 815 may include an API specification identifying component 820, a service identifying component 825, a default mock implementation determining component 830, a default mock implementation requesting component 835, and a mock implementation requesting component 840. The controller 815 may be an example of aspects of the controller 1010 described herein.

The controller 815 may support testing of an API. For example, the API specification identifying component 820 may identify an API specification for the API. The service identifying component 825 may identify a service associated with the API specification based on metadata of the API specification. The default mock implementation determining component 830 may determine to run a default mock implementation of the service at a server. The default mock implementation requesting component 835 may transmit, to the server, a first request message indicating the default mock implementation of the service. The mock implementation requesting component 840 may transmit, to the server, a second request message indicating a mock implementation of the API.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
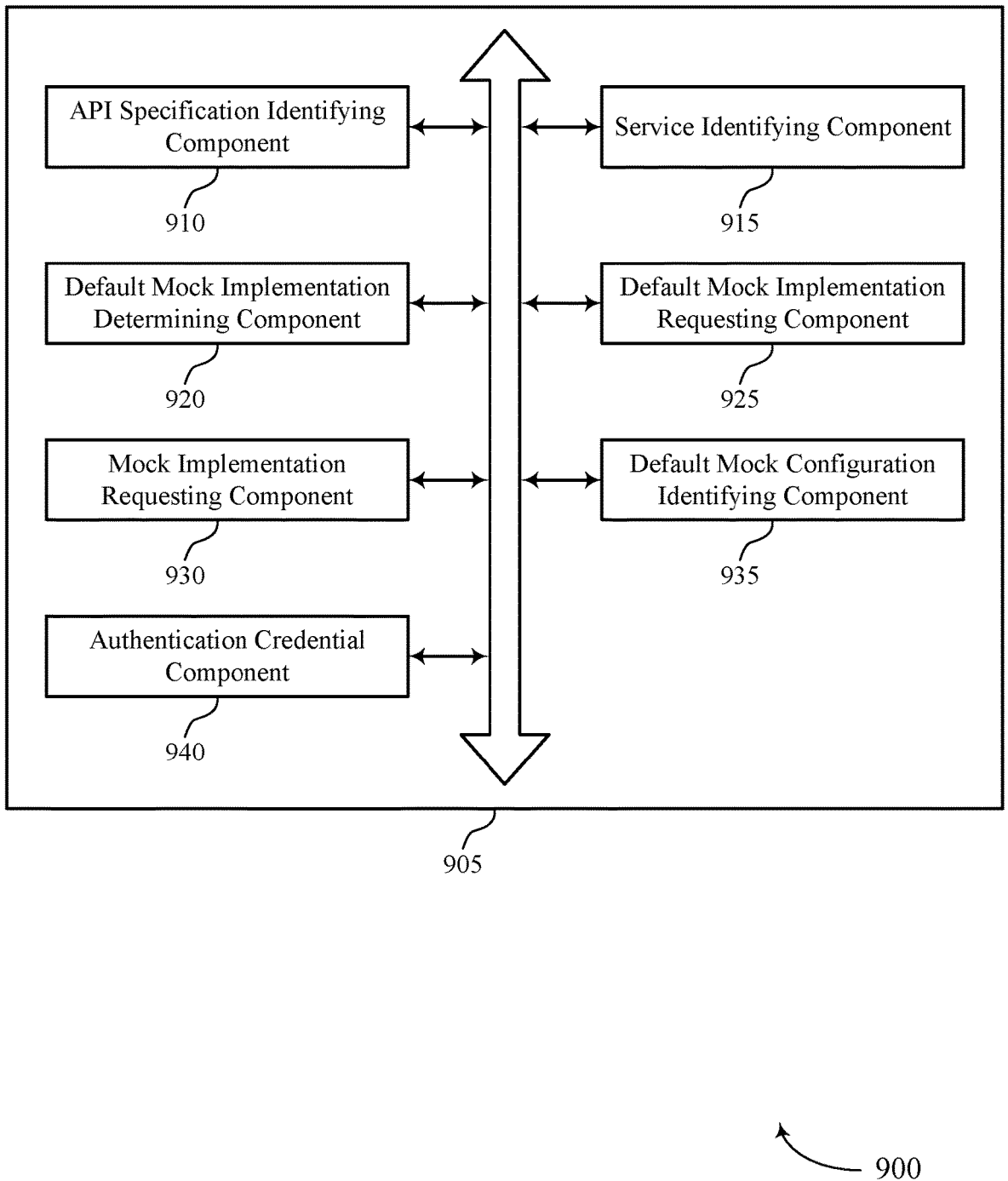
FIG. 9 shows a block diagram of a controller that supports default mock implementations at a server in accordance with aspects of the present disclosure.

FIG. 9 shows a block diagram 900 of a controller 905 that supports default mock implementations at a server in accordance with aspects of the present disclosure. The controller 905 may be an example of aspects of a controller 815 or a controller 1010 described herein. The controller 905 may include an API specification identifying component 910, a service identifying component 915, a default mock implementation determining component 920, a default mock implementation requesting component 925, a mock implementation requesting component 930, a default mock configuration identifying component 935, and an authentication credential component 940. Each of these modules may communicate, directly or indirectly, with one another (e.g., via one or more buses). The controller 905 may be a component of a user device and may support testing an API.

The API specification identifying component 910 may identify an API specification for the API. The service identifying component 915 may identify a service associated with the API specification based on metadata of the API specification. In some examples, the service identifying component 915 may select an additional service from a set of services in a list at a user interface at the user device. In some examples, the service identifying component 915 may determine a security scheme definition for the API specification based on the metadata of the API specification, where the security scheme definition corresponds to the service associated with the API specification. In some cases, the security scheme definition includes OAUTH 1.0, OAUTH 2.0, basic authentication, digest authentication, pass through authentication, or a combination thereof.

The default mock implementation determining component 920 may determine to run a default mock implementation of the service at a server. The default mock implementation requesting component 925 may transmit, to the server, a first request message indicating the default mock implementation of the service. In some examples, the default mock implementation requesting component 925 may transmit a URL indicating the default mock implementation of the service. In some examples, the default mock implementation requesting component 925 may transmit, to the server, another request message indicating an additional default mock implementation for the additional service. In some examples, the default mock implementation requesting component 925 may receive an indication that the default mock implementation of the service was run successfully, where a second request message is transmitted to the server based on the indication.

The mock implementation requesting component 930 may transmit, to the server, the second request message indicating a mock implementation of the API. The default mock configuration identifying component 935 may identify, via a user interface at the user device, a configuration indicating to run the default mock implementation of the service at the server.

The authentication credential component 940 may receive, from the server, an authentication credential for the service associated with the default mock implementation based on transmitting the first request message to the server, where the service associated with the default mock implementation is a security service that is utilized by the API specification for the API. In some examples, the authentication credential component 940 may receive a security credential as user input for a user of the user device. In some examples, the authentication credential component 940 may transmit the security credential for the user of the user device with the first request message indicating the default mock implementation of the service.

Figure 10:
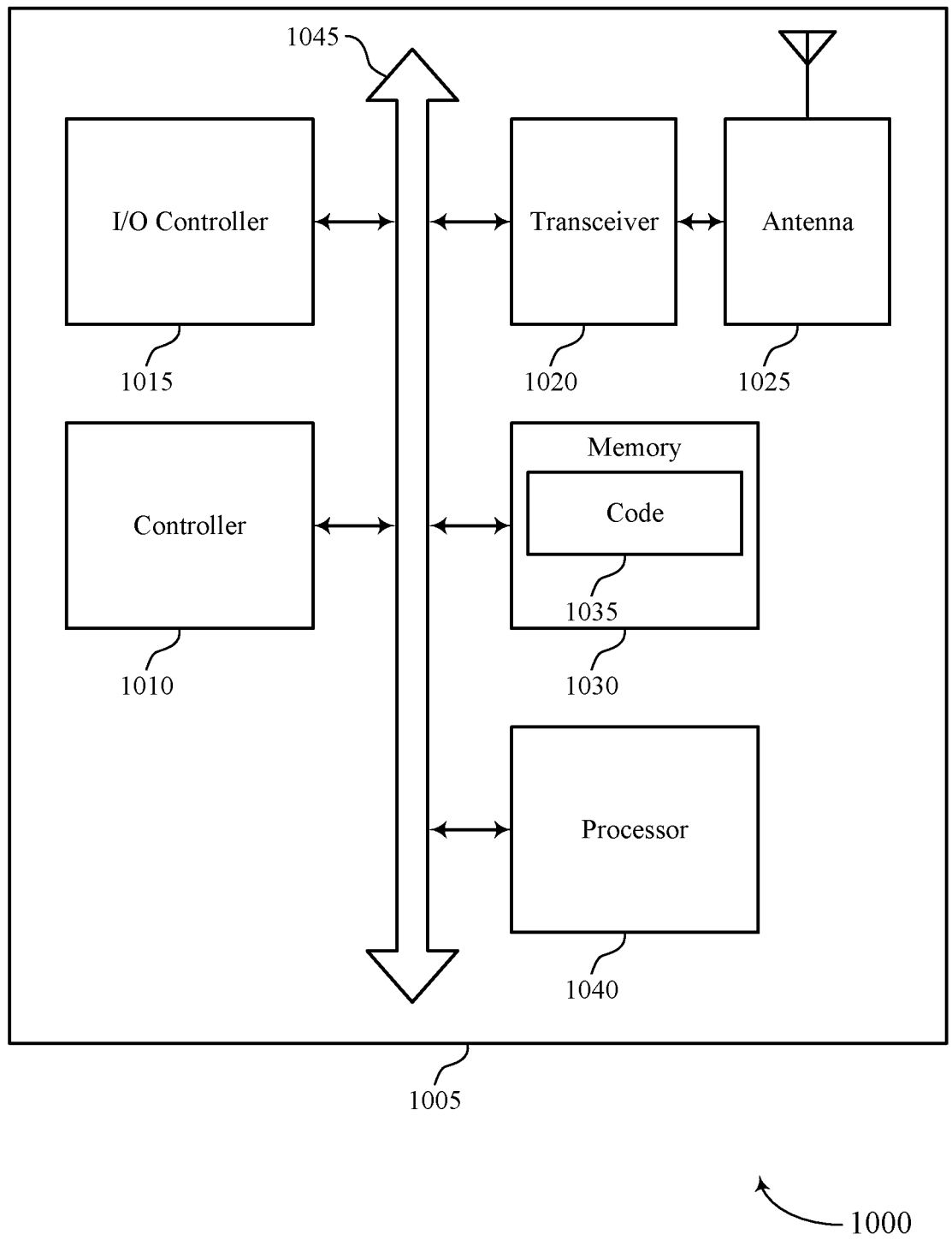
FIG. 10 shows a diagram of a system including a device that supports default mock implementations at a server in accordance with aspects of the present disclosure.

FIG. 10 shows a diagram of a system 1000 including a device 1005 that supports default mock implementations at a server in accordance with aspects of the present disclosure. The device 1005 may be an example of or include the components of device 805 as described herein. The device 1005 may include components for bi-directional voice and data communications including components for transmitting and receiving communications, including a controller 1010, an I/O controller 1015, a transceiver 1020, an antenna 1025, memory 1030, and a processor 1040. These components may be in electronic communication via one or more buses (e.g., bus 1045). The device 1005 may be an example of a user device as described herein, where the device 1005 supports testing an API (e.g., using a mocking service at a server).

The controller 1010 may identify an API specification for the API, identify a service associated with the API specification based on metadata of the API specification, determine to run a default mock implementation of the service at a server, transmit, to the server, a first request message indicating the default mock implementation of the service, and transmit, to the server, a second request message indicating a mock implementation of the API.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting default mock implementations at a server).

The code 1035 may include instructions to implement aspects of the present disclosure, including instructions to support testing an API at a server. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
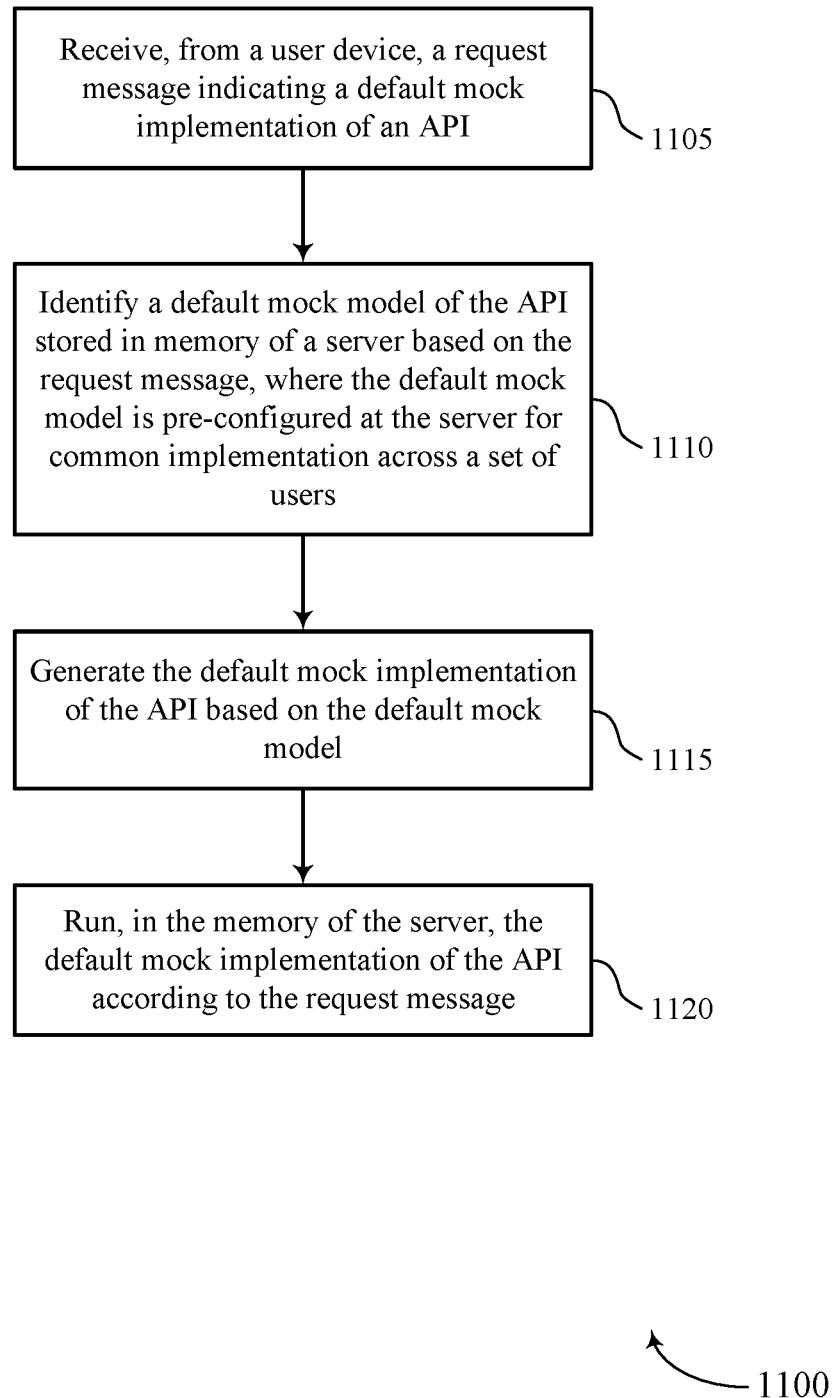
FIGS. 11 through 13 show flowcharts illustrating methods that support default mock implementations at a server in accordance with aspects of the present disclosure.

FIG. 11 shows a flowchart illustrating a method 1100 that supports default mock implementations at a server in accordance with aspects of the present disclosure. The operations of method 1100 may be implemented by an application server or its components as described herein. For example, the operations of method 1100 may be performed by a controller as described with reference to FIGS. 5 through 7. In some examples, an application server may execute a set of instructions to control the functional elements of the application server to perform the functions described below.

Additionally or alternatively, an application server may perform aspects of the functions described below using special-purpose hardware.

At 1105, the application server may receive, from a user device, a request message indicating a default mock implementation of an API. The operations of 1105 may be performed according to the methods described herein. In some examples, aspects of the operations of 1105 may be performed by a request message receiving component as described with reference to FIGS. 5 through 7.

At 1110, the application server may identify a default mock model of the API stored in memory of the server based on the request message, where the default mock model is pre-configured at the server for common implementation across a set of users. The operations of 1110 may be performed according to the methods described herein. In some examples, aspects of the operations of 1110 may be performed by a default mock model identifying component as described with reference to FIGS. 5 through 7.

At 1115, the application server may generate the default mock implementation of the API based on the default mock model. The operations of 1115 may be performed according to the methods described herein. In some examples, aspects of the operations of 1115 may be performed by a default mock model generating component as described with reference to FIGS. 5 through 7.

At 1120, the application server may run, in the memory of the server, the default mock implementation of the API according to the request message. The operations of 1120 may be performed according to the methods described herein. In some examples, aspects of the operations of 1120 may be performed by a default mock model running component as described with reference to FIGS. 5 through 7.

Figure 12:
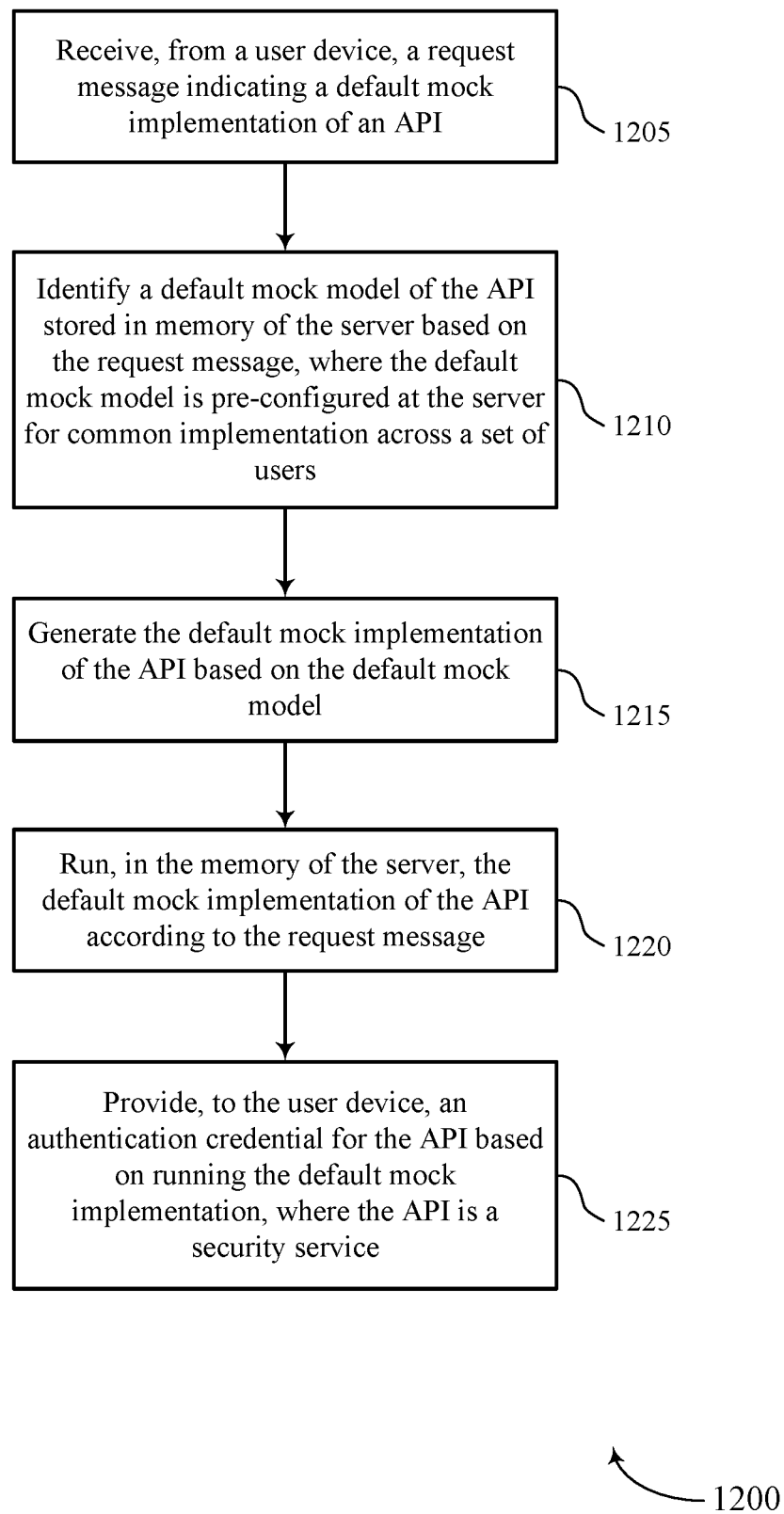

FIG. 12 shows a flowchart illustrating a method 1200 that supports default mock implementations at a server in accordance with aspects of the present disclosure. The operations of method 1200 may be implemented by an application server or its components as described herein. For example, the operations of method 1200 may be performed by a controller as described with reference to FIGS. 5 through 7. In some examples, an application server may execute a set of instructions to control the functional elements of the application server to perform the functions described below. Additionally or alternatively, an application server may perform aspects of the functions described below using special-purpose hardware.

At 1205, the application server may receive, from a user device, a request message indicating a default mock implementation of an API. The operations of 1205 may be performed according to the methods described herein. In some examples, aspects of the operations of 1205 may be performed by a request message receiving component as described with reference to FIGS. 5 through 7.

At 1210, the application server may identify a default mock model of the API stored in memory of the server based on the request message, where the default mock model is pre-configured at the server for common implementation across a set of users. The operations of 1210 may be performed according to the methods described herein. In some examples, aspects of the operations of 1210 may be performed by a default mock model identifying component as described with reference to FIGS. 5 through 7.

At 1215, the application server may generate the default mock implementation of the API based on the default mock model. The operations of 1215 may be performed according to the methods described herein. In some examples, aspects of the operations of 1215 may be performed by a default mock model generating component as described with reference to FIGS. 5 through 7.

At 1220, the application server may run, in the memory of the server, the default mock implementation of the API according to the request message. The operations of 1220 may be performed according to the methods described herein. In some examples, aspects of the operations of 1220 may be performed by a default mock model running component as described with reference to FIGS. 5 through 7.

At 1225, the application server may provide, to the user device, an authentication credential for the API based on running the default mock implementation if the API corresponds to a security service. The operations of 1225 may be performed according to the methods described herein. In some examples, aspects of the operations of 1225 may be performed by an authentication credential component as described with reference to FIGS. 5 through 7.

Figure 13:
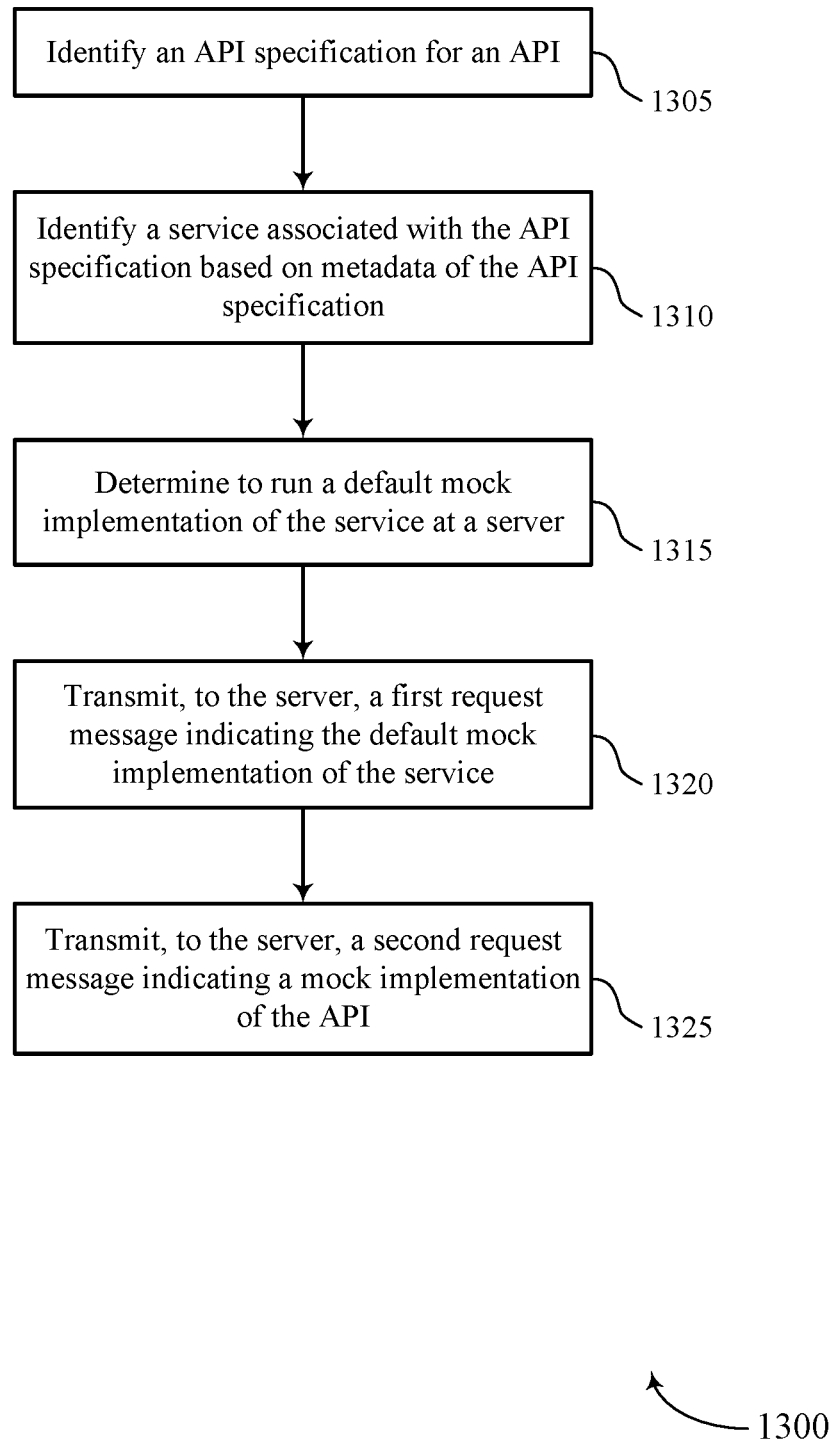

FIG. 13 shows a flowchart illustrating a method 1300 that supports default mock implementations at a server in accordance with aspects of the present disclosure. The operations of method 1300 may be implemented by a device or its components as described herein. For example, the operations of method 1300 may be performed by a controller as described with reference to FIGS. 8 through 10. In some examples, a device may execute a set of instructions to control the functional elements of the device to perform the functions described below. Additionally or alternatively, a device may perform aspects of the functions described below using special-purpose hardware.

At 1305, the device may identify an API specification for an API. The operations of 1305 may be performed according to the methods described herein. In some examples, aspects of the operations of 1305 may be performed by an API specification identifying component as described with reference to FIGS. 8 through 10.

At 1310, the device may identify a service associated with the API specification based on metadata of the API specification. The operations of 1310 may be performed according to the methods described herein. In some examples, aspects of the operations of 1310 may be performed by a service identifying component as described with reference to FIGS. 8 through 10.

At 1315, the device may determine to run a default mock implementation of the service at a server. The operations of 1315 may be performed according to the methods described herein. In some examples, aspects of the operations of 1315 may be performed by a default mock implementation determining component as described with reference to FIGS. 8 through 10.

At 1320, the device may transmit, to the server, a first request message indicating the default mock implementation of the service. The operations of 1320 may be performed according to the methods described herein. In some examples, aspects of the operations of 1320 may be performed by a default mock implementation requesting component as described with reference to FIGS. 8 through 10.

At 1325, the device may transmit, to the server, a second request message indicating a mock implementation of the API. The operations of 1325 may be performed according to the methods described herein. In some examples, aspects of the operations of 1325 may be performed by a mock implementation requesting component as described with reference to FIGS. 8 through 10.

A method for testing an API at a server is described. The method may include receiving, from a user device, a request message indicating a default mock implementation of the API, identifying a default mock model of the API stored in memory of the server based on the request message, where the default mock model is pre-configured at the server for common implementation across a set of users, generating the default mock implementation of the API based on the default mock model, and running, in the memory of the server, the default mock implementation of the API according to the request message.

An apparatus for testing an API at a server is described. The apparatus may include a processor, memory in electronic communication with the processor, and instructions stored in the memory. The instructions may be executable by the processor to cause the apparatus to receive, from a user device, a request message indicating a default mock implementation of the API, identify a default mock model of the API stored in memory of the server based on the request message, where the default mock model is pre-configured at the server for common implementation across a set of users, generate the default mock implementation of the API based on the default mock model, and run, in the memory of the server, the default mock implementation of the API according to the request message.

Another apparatus for testing an API at a server is described. The apparatus may include means for receiving, from a user device, a request message indicating a default mock implementation of the API, identifying a default mock model of the API stored in memory of the server based on the request message, where the default mock model is pre-configured at the server for common implementation across a set of users, generating the default mock implementation of the API based on the default mock model, and running, in the memory of the server, the default mock implementation of the API according to the request message.

A non-transitory computer-readable medium storing code for testing an API at a server is described. The code may include instructions executable by a processor to receive, from a user device, a request message indicating a default mock implementation of the API, identify a default mock model of the API stored in memory of the server based on the request message, where the default mock model is pre-configured at the server for common implementation across a set of users, generate the default mock implementation of the API based on the default mock model, and run, in the memory of the server, the default mock implementation of the API according to the request message.

Some examples of the method, apparatuses, and non-transitory computer-readable medium described herein may further include operations, features, means, or instructions for providing, to the user device, an authentication credential for the API based on running the default mock implementation, where the API is a security service.

In some examples of the method, apparatuses, and non-transitory computer-readable medium described herein, the request message indicates a URL corresponding to the default mock implementation.

Some examples of the method, apparatuses, and non-transitory computer-readable medium described herein may further include operations, features, means, or instructions for receiving a new default mock model of a new API and storing the new default mock model of the new API in the memory of the server.

In some examples of the method, apparatuses, and non-transitory computer-readable medium described herein, the user device is associated with a first user of a first tenant. Some examples of the method, apparatuses, and non-transitory computer-readable medium described herein may further include operations, features, means, or instructions for receiving, from an additional user device, an additional request message indicating the default mock implementation of the API, where the additional user device may be associated with a second user of a second tenant. The method, apparatuses, and non-transitory computer-readable medium described herein may further include operations, features, means, or instructions for identifying the default mock model of the API stored in memory of the server based on the additional request message, generating an additional default mock implementation of the API based on the default mock model, and running, in the memory of the server, the additional default mock implementation of the API according to the additional request message.

Some examples of the method, apparatuses, and non-transitory computer-readable medium described herein may further include operations, features, means, or instructions for receiving, from an additional user device, an identifier indicating an API specification for an additional API, retrieving the API specification from a source external to the server based on the identifier, parsing, in the memory of the server, the API specification to determine a parsed model for the API specification, receiving, from the additional user device, an additional request message indicating a mock implementation of the additional API, generating the mock implementation of the additional API based on the parsed model for the API specification, and running, in the memory of the server, the mock implementation of the additional API according to the additional request message.

Some examples of the method, apparatuses, and non-transitory computer-readable medium described herein may further include operations, features, means, or instructions for receiving, from an additional user device, a mock model for an API specification for an additional API, receiving, from the additional user device, an additional request message indicating a mock implementation of the additional API, generating the mock implementation of the additional API based on the mock model for the API specification, and running, in the memory of the server, the mock implementation of the additional API according to the additional request message.

Additionally, a method for testing an API at a user device is described. The method may include identifying an API specification for the API, identifying a service associated with the API specification based on metadata of the API specification, determining to run a default mock implementation of the service at a server, transmitting, to the server, a first request message indicating the default mock implementation of the service, and transmitting, to the server, a second request message indicating a mock implementation of the API.

An apparatus for testing an API at a user device is described. The apparatus may include a processor, memory in electronic communication with the processor, and instructions stored in the memory. The instructions may be executable by the processor to cause the apparatus to identify an API specification for the API, identify a service associated with the API specification based on metadata of the API specification, determine to run a default mock implementation of the service at a server, transmit, to the server, a first request message indicating the default mock implementation of the service, and transmit, to the server, a second request message indicating a mock implementation of the API.

Another apparatus for testing an API at a user device is described. The apparatus may include means for identifying an API specification for the API, identifying a service associated with the API specification based on metadata of the API specification, determining to run a default mock implementation of the service at a server, transmitting, to the server, a first request message indicating the default mock implementation of the service, and transmitting, to the server, a second request message indicating a mock implementation of the API.

A non-transitory computer-readable medium storing code for testing an API at a user device is described. The code may include instructions executable by a processor to identify an API specification for the API, identify a service associated with the API specification based on metadata of the API specification, determine to run a default mock implementation of the service at a server, transmit, to the server, a first request message indicating the default mock implementation of the service, and transmit, to the server, a second request message indicating a mock implementation of the API.

Some examples of the method, apparatuses, and non-transitory computer-readable medium described herein may further include operations, features, means, or instructions for identifying, via a user interface at the user device, a configuration indicating to run the default mock implementation of the service at the server.

Some examples of the method, apparatuses, and non-transitory computer-readable medium described herein may further include operations, features, means, or instructions for receiving, from the server, an authentication credential for the service associated with the default mock implementation based on transmitting the first request message to the server, where the service associated with the default mock implementation may be a security service that may be utilized by the API specification for the API.

In some examples of the method, apparatuses, and non-transitory computer-readable medium described herein, transmitting the first request message may include operations, features, means, or instructions for transmitting a URL indicating the default mock implementation of the service.

Some examples of the method, apparatuses, and non-transitory computer-readable medium described herein may further include operations, features, means, or instructions for selecting an additional service from a set of services in a list at a user interface at the user device and transmitting, to the server, a third request message indicating an additional default mock implementation for the additional service.

Some examples of the method, apparatuses, and non-transitory computer-readable medium described herein may further include operations, features, means, or instructions for receiving a security credential as user input for a user of the user device and transmitting the security credential for the user of the user device with the first request message indicating the default mock implementation of the service.

Some examples of the method, apparatuses, and non-transitory computer-readable medium described herein may further include operations, features, means, or instructions for receiving an indication that the default mock implementation of the service was run successfully, where the second request message may be transmitted to the server based on the indication.

In some examples of the method, apparatuses, and non-transitory computer-readable medium described herein, identifying the service associated with the API specification further may include operations, features, means, or instructions for determining a security scheme definition for the API specification based on the metadata of the API specification, where the security scheme definition corresponds to the service associated with the API specification.

In some examples of the method, apparatuses, and non-transitory computer-readable medium described herein, the security scheme definition includes OAUTH 1.0, OAUTH 2.0, basic authentication, digest authentication, pass through authentication, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for testing an application programming interface (API) at a server, comprising:
   receiving, from a user device, a request message indicating a mock model corresponding to a mock implementation of the API;
   identifying a default mock model of a plurality of default mock models stored in memory of the server based at least in part on the request message, wherein the default mock model corresponds to a service associated with the mock implementation of the API and is pre-configured at the server for common implementation across a plurality of users;
   running, in the memory of the server, the service according to the default mock model, wherein running the service generates a service credential for the API;
   generating the mock implementation of the API based at least in part on the request message indicating the mock model; and
   running, in the memory of the server and based at least in part on the service credential, the mock implementation of the API according to the request message.

2. The method of claim 1, further comprising:
   providing, to the user device, the service credential based at least in part on running the service according to the default mock model, wherein the service credential is an authentication credential and the service is a security service.

3. The method of claim 1, wherein the request message indicates a Uniform Resource Locator (URL) corresponding to the service.

4. The method of claim 1, further comprising:
   receiving a new default mock model corresponding to a new service associated with a new API; and
   storing the new default mock model corresponding to the new service associated with the new API in the memory of the server.

5. The method of claim 1, wherein the user device is associated with a first user of a first tenant, the method further comprising:
   receiving, from an additional user device, an additional request message indicating an additional mock model corresponding to an additional mock implementation of an additional API, wherein the additional user device is associated with a second user of a second tenant and the mock implementation of the additional API corresponds to the service;
   identifying the default mock model of the plurality of default mock models stored in memory of the server based at least in part on the additional request message;
   generating the additional mock implementation of the additional API based at least in part on the default additional mock model;
   running, in the memory of the server, the service according to the default mock model, wherein running the service generates an additional service credential for the API; and
   running, in the memory of the server, the service according to the additional mock model.

6. The method of claim 1, further comprising:
   receiving, from an additional user device, an identifier indicating an API specification for an additional API;
   retrieving the API specification from a source external to the server based at least in part on the identifier;
   parsing, in the memory of the server, the API specification to determine a parsed model for the API specification;
   receiving, from the additional user device, an additional request message indicating a mock model corresponding to a mock implementation of the additional API;
   generating the mock implementation of the additional API based at least in part on the parsed model for the API specification; and
   running, in the memory of the server, the mock implementation of the additional API according to the additional request message.

7. The method of claim 1, further comprising:
   receiving, from an additional user device, a mock model for an API specification for an additional API;
   receiving, from the additional user device, an additional request message indicating a mock implementation of the additional API;

generating the mock implementation of the additional API based at least in part on the mock model for the API specification; and running, in the memory of the server, the mock implementation of the additional API according to the additional request message.

8. A method for testing an application programming interface (API) at a user device, comprising:

identifying an API specification for the API, the API specification indicating a mock model corresponding to a mock implementation of the API;

identifying a service associated with the API specification based at least in part on metadata of the API specification, wherein the metadata of the API specification indicates a default mock model corresponding to the service;

determining to run a default mock implementation of the service at a server, wherein running the service generates a service credential for the API;

transmitting, to the server, a first request message indicating the default mock implementation of the service; and transmitting, to the server, a second request message indicating the mock model corresponding to the mock implementation of the API.

9. The method of claim 8, further comprising:

identifying, via a user interface at the user device, a configuration indicating to run the default mock implementation of the service at the server.

10. The method of claim 8, further comprising:

receiving, from the server, an authentication credential for the service associated with the default mock implementation based at least in part on transmitting the first request message to the server, wherein the service associated with the default mock implementation is a security service that is utilized by the API specification for the API.

11. The method of claim 8, wherein transmitting the first request message comprises:

transmitting a Uniform Resource Locator (URL) indicating the default mock implementation of the service.

12. The method of claim 8, further comprising:

selecting an additional service from a plurality of services in a list at a user interface at the user device; and transmitting, to the server, a third request message indicating an additional default mock implementation for the additional service.

13. The method of claim 8, further comprising:

receiving a security credential as user input for a user of the user device; and transmitting the security credential for the user of the user device with the first request message indicating the default mock implementation of the service.

14. The method of claim 8, further comprising:

receiving an indication that the default mock implementation of the service was run successfully, wherein the second request message is transmitted to the server based at least in part on the indication.

15. The method of claim 8, wherein identifying the service associated with the API specification further comprises:

determining a security scheme definition for the API specification based at least in part on the metadata of the API specification, wherein the security scheme definition corresponds to the service associated with the API specification.

16. The method of claim 15, wherein the security scheme definition comprises OAUTH 1.0, OAUTH 2.0, basic authentication, digest authentication, pass through authentication, or a combination thereof.

17. An apparatus for testing an application programming interface (API) at a server, comprising:

a processor;

memory in electronic communication with the processor; and instructions stored in the memory and executable by the processor to cause the apparatus to:

receive, from a user device, a request message indicating a mock model corresponding to a mock implementation of the API;

identify a default mock model of a plurality of default mock models stored in memory of the server based at least in part on the request message, wherein the default mock model corresponds to a service associated with the mock implementation of the API and is pre-configured at the server for common implementation across a plurality of users;

run, in the memory of the server, the service according to the default mock model, wherein running the service generates a service credential for the API;

generate the mock implementation of the API based at least in part on the request message indicating the mock model; and run, in the memory of the server and based at least in part on the service credential, the mock implementation of the API according to the request message.

18. The apparatus of claim 17, wherein the instructions are further executable by the processor to cause the apparatus to:

provide, to the user device, the service credential based at least in part on running the service according to the default mock model, wherein the service credential is an authentication credential and the service is a security service.

19. The apparatus of claim 17, wherein the request message indicates a Uniform Resource Locator (URL) corresponding to the service.

20. The apparatus of claim 17, wherein the instructions are further executable by the processor to cause the apparatus to:

receive a new default mock model corresponding to a new service associated with a new API; and store the new default mock model corresponding to the new service associated with the new API in the memory of the server.

* * * * *